United States Patent
Matsumoto et al.

(10) Patent No.: US 9,661,292 B2
(45) Date of Patent: May 23, 2017

(54) CONTENT PLAYBACK DEVICE AND CONTENT PLAYBACK METHOD

(71) Applicant: Panasonic Corporation, Osaka (JP)

(72) Inventors: Takuya Matsumoto, Osaka (JP); Norihiro Matsui, Osaka (JP); Rinako Kamei, Osaka (JP); Shohji Ohtsubo, Kanagawa (JP); Hiromi Iida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 81 days.

(21) Appl. No.: 14/001,345

(22) PCT Filed: Dec. 28, 2012

(86) PCT No.: PCT/JP2012/008425
§ 371 (c)(1),
(2) Date: Aug. 23, 2013

(87) PCT Pub. No.: WO2013/099282
PCT Pub. Date: Jul. 4, 2013

(65) Prior Publication Data
US 2013/0330059 A1    Dec. 12, 2013

(30) Foreign Application Priority Data
Dec. 28, 2011    (JP) .................. 2011-289752

(51) Int. Cl.
*H04N 9/80*    (2006.01)
*H04N 9/87*    (2006.01)
(Continued)

(52) U.S. Cl.
CPC ............ *H04N 9/8715* (2013.01); *G09B 5/06* (2013.01); *H04N 21/4325* (2013.01);
(Continued)

(58) Field of Classification Search
CPC ... G11B 27/105; G11B 27/329; G11B 27/034; H04N 5/85; H04N 9/8042
(Continued)

(56) References Cited

U.S. PATENT DOCUMENTS 8,166,073 B2    4/2012    Watanabe et al.
8,244,771 B2    8/2012    Watanabe et al.
(Continued)

FOREIGN PATENT DOCUMENTS

JP    10-234004    9/1998
JP    2006-60279    3/2006
(Continued)

OTHER PUBLICATIONS

International Search Report issued Feb. 12, 2013 in International Application No. PCT/JP2012/008425.

*Primary Examiner* — William C Vaughn, Jr.
*Assistant Examiner* — Daniel Tekle
(74) *Attorney, Agent, or Firm* — Wenderoth, Lind & Ponack, L.L.P.

(57) ABSTRACT

A content playback device includes: a video playback unit which plays content having plural scenes; an object appearance information acquisition unit which acquires, for each of the plural scenes, object appearance information of each of one or more objects which appear in the content by analyzing metadata which includes appearance scene data for identifying the one or more objects appearing in at least one of the scenes, the object appearance information indicating whether the object appears at least in or after the scene; and a display unit which presents the object appearance information acquired for a scene being played, when the video playback unit is playing the content.

21 Claims, 30 Drawing Sheets

(51) Int. Cl.
*H04N 21/4722* (2011.01)
*H04N 21/845* (2011.01)
*H04N 21/432* (2011.01)
*H04N 21/472* (2011.01)
*H04N 21/858* (2011.01)
*G09B 5/06* (2006.01)

(52) U.S. Cl.
CPC ... *H04N 21/4722* (2013.01); *H04N 21/47217* (2013.01); *H04N 21/8456* (2013.01); *H04N 21/858* (2013.01)

(58) Field of Classification Search
USPC .......................................................... 386/241
See application file for complete search history.

(56) References Cited

U.S. PATENT DOCUMENTS

| | | | |
|---|---|---|---|
| 8,260,819 B2 | 9/2012 | Watanabe et al. | |
| 8,266,183 B2 | 9/2012 | Watanabe et al. | |
| 8,301,663 B2 | 10/2012 | Watanabe et al. | |
| 8,301,664 B2 | 10/2012 | Watanabe et al. | |
| 2007/0118801 A1* | 5/2007 | Harshbarger | G11B 27/031 715/730 |
| 2007/0294242 A1 | 12/2007 | Watanabe et al. | |
| 2009/0253111 A1* | 10/2009 | Teicher | G09B 5/062 434/308 |
| 2010/0007792 A1* | 1/2010 | Kim | H04N 5/44513 348/569 |
| 2010/0074590 A1* | 3/2010 | Momosaki | G11B 27/034 386/278 |
| 2010/0198801 A1 | 8/2010 | Watanabe et al. | |
| 2010/0198853 A1 | 8/2010 | Watanabe et al. | |
| 2010/0198878 A1 | 8/2010 | Watanabe et al. | |
| 2010/0198884 A1 | 8/2010 | Watanabe et al. | |
| 2010/0223271 A1 | 9/2010 | Watanabe et al. | |
| 2012/0308202 A1 | 12/2012 | Murata et al. | |

FOREIGN PATENT DOCUMENTS

| | | |
|---|---|---|
| JP | 2006-163604 | 6/2006 |
| JP | 2007-174477 | 7/2007 |
| JP | 2010-211747 | 9/2010 |
| JP | 2012-249156 | 12/2012 |

\* cited by examiner

FIG. 3

(a) Metadata

| Metadata ID | Video ID | Scene count | Scene ID list (Chronological order) |
|---|---|---|---|

10001

(b) Scene information

| Scene ID | Start time | End time | Object count | Object ID list |
|---|---|---|---|---|

10002

(c) Object information

| Object ID | Name | Explanation | Icon data | Image (Link etc.) | Ingredient count | Ingredient ID list |
|---|---|---|---|---|---|---|

10003

(d) Ingredient information

| Ingredient ID | Name | Amount | Explanation | Image (Link etc.) |
|---|---|---|---|---|

(a) Metadata

| Metadata ID | Video ID | Scene count | Scene ID list |
|---|---|---|---|
| | | 8 | A, B, C, D, E, F, G, H |

(b) Scene information

| Scene ID A | Start time 00:00:00 | End time 00:01:00 | Object count 2 | Object ID list P, Q |
|---|---|---|---|---|
| Scene ID B | Start time 00:01:00 | End time 00:03:00 | Object count 1 | Object ID list R |
| Scene ID C | Start time 00:03:00 | End time 00:05:00 | Object count 2 | Object ID list P, Q |
| Scene ID D | Start time 00:05:00 | End time 00:08:00 | Object count 2 | Object ID list R, S |
| Scene ID E | Start time 00:08:00 | End time 00:10:00 | Object count 2 | Object ID list S, T |
| Scene ID F | Start time 00:10:00 | End time 00:12:00 | Object count 1 | Object ID list S |
| Scene ID G | Start time 00:12:00 | End time 00:14:30 | Object count 2 | Object ID list S, T |
| Scene ID H | Start time 00:14:30 | End time 00:15:00 | Object count 0 | Object ID list |

(c) Object information

| Object ID P | Name Kitchen knife | Explanation | Icon data | Image (Link etc.) |
|---|---|---|---|---|
| Object ID Q | Name Cutting board | Explanation | Icon data | Image (Link etc.) |
| Object ID R | Name Bowl | Explanation | Icon data | Image (Link etc.) |
| Object ID S | Name Frying pan | Explanation | Icon data | Image (Link etc.) |
| Object ID T | Name Dish | Explanation | Icon data | Image (Link etc.) |

(a) Appearance object count

— 20001

(b) Appearance object table — 20002

| Index (Array number) | Object ID of appearance object | Last appearance scene number |
|---|---|---|
| 0 | P | 3 |
| 1 | Q | 3 |
| 2 | R | 3 |
| 3 | S | 7 |
| 4 | T | 6 |

FIG. 8
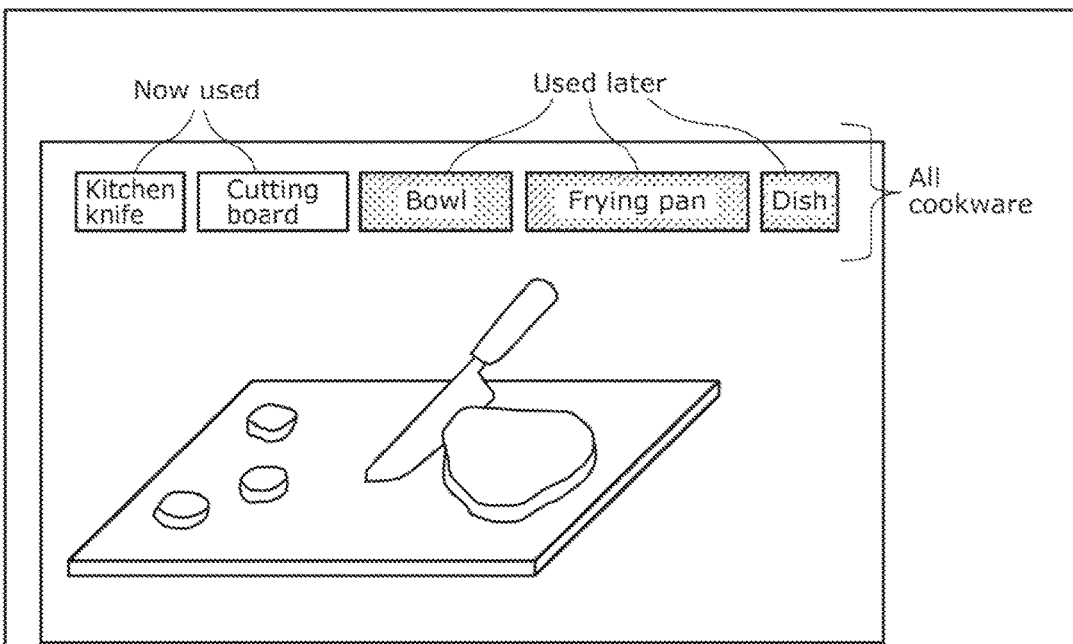
(a) Scene 1: Display example of "Cut liver"
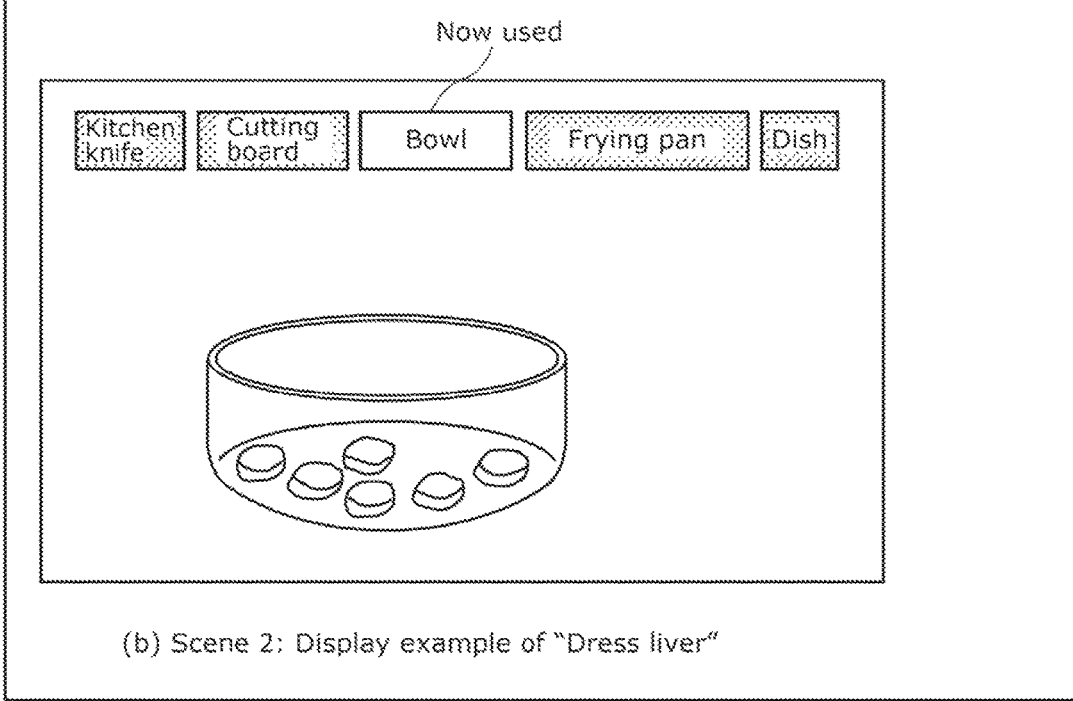
(b) Scene 2: Display example of "Dress liver"

(a) Scene 3: Display example of "Cut oriental garlic"

(b) Scene 4: Display example of "Stir-fry liver"

FIG. 10
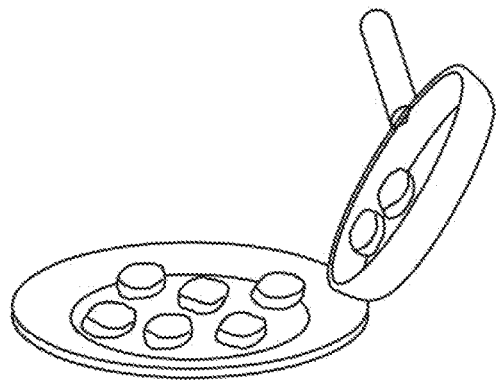
(a) Scene 5: Display example of "Stir-fry liver"
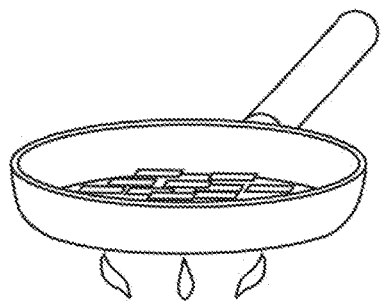
(b) Scene 6: Display example of "Stir-fry oriental garlic"

FIG. 11
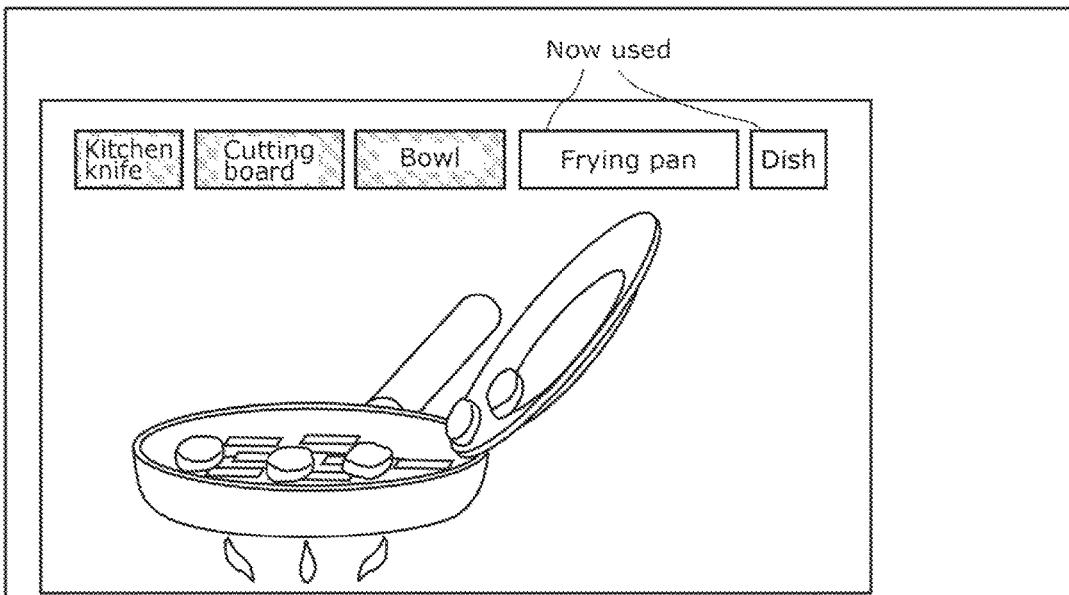
(a) Scene 7: Display example of "Add liver and stir-fry"
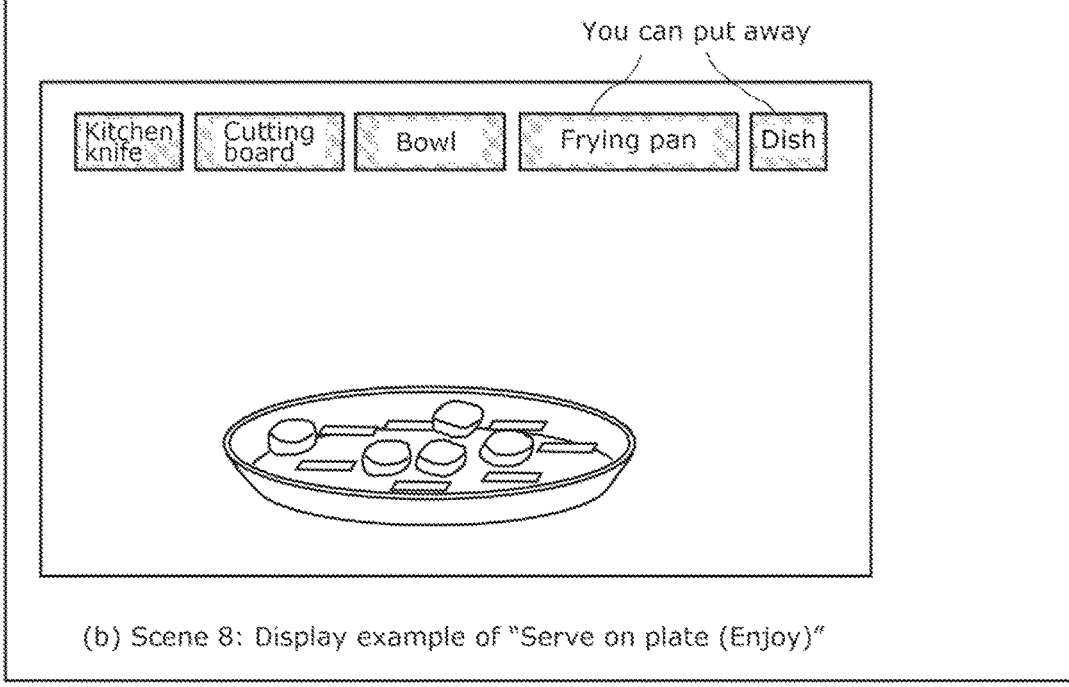
(b) Scene 8: Display example of "Serve on plate (Enjoy)"

FIG. 14A

| Recipe ID | 0001 | | |
|---|---|---|---|
| Dish name | Potato croquette | | |
| Ingredients | Potatoes, minced pork, egg, flour | | |
| Cooking time | 35 minutes | | |
| Calories | 600 kcal | | |
| Cooking processes | Process ID | Detailed cooking process | Cookware ID |
| | 1 | Boil potatoes | 004 |
| | 2 | Mash potatoes | 008, 023 |
| | 3 | Stir-fry minced pork in frying pan at high heat | 006 |
| | 4 | Knead potatoes and mince pork | 008 |
| | 5 | Cover 4 with beaten egg and flour | 007 |
| | 6 | Deep-fry 5 | 006 |

| Cookware ID | Cookware name | Icon image |
|---|---|---|
| 001 | Kitchen knife | 001.Jpg |
| 002 | Cutting board | 002.Jpg |
| 003 | Pot (large) | 003.Jpg |
| 004 | Pot (medium) | 004.Jpg |
| 005 | Pot (small) | 005.Jpg |
| 006 | Frying pan | 006.Jpg |
| 007 | Tray | 007.Jpg |
| 008 | Bowl | 008.Jpg |
| ⋮ | ⋮ | ⋮ |
| 023 | Potato musher | 023.Jpg |
| ⋮ | ⋮ | ⋮ |

| Cookware ID | Cookware name | Icon image |
|---|---|---|
| 004 | Pot (medium) | 004.Jpg |
| 006 | Frying pan | 006.Jpg |
| 007 | Tray | 007.Jpg |
| 008 | Bowl | 008.Jpg |
| 023 | Potato musher | 023.Jpg |

| Cookware ID | Last use process ID |
|---|---|
| 004 | 1 |
| 006 | 6 |
| 007 | 5 |
| 008 | 4 |
| 023 | 2 |

FIG. 16C

| Current process ID | 2 |
|---|---|
| Cookware ID used in current process | 008, 023 |
| Cookware ID not used in current process | 004, 006, 007 |
| Cookware ID not used in and after current process | 004 |

1621

(a) Scene 7: Display example of "Add liver and stir-fry"

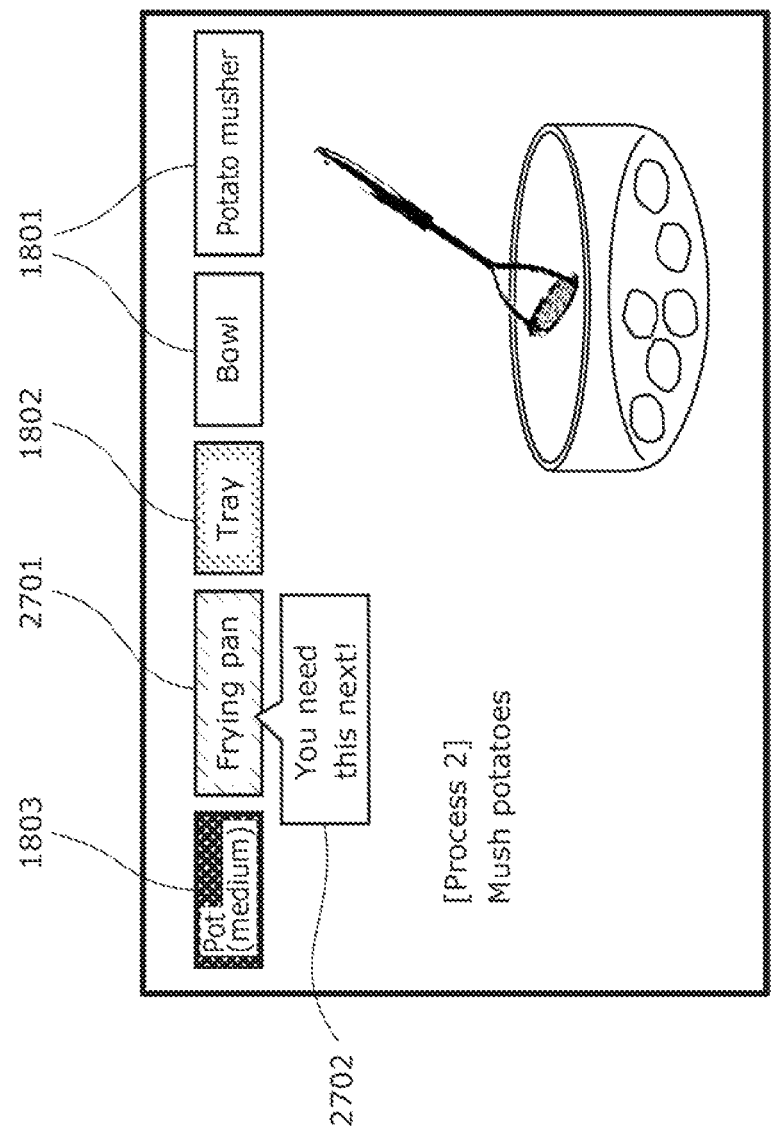

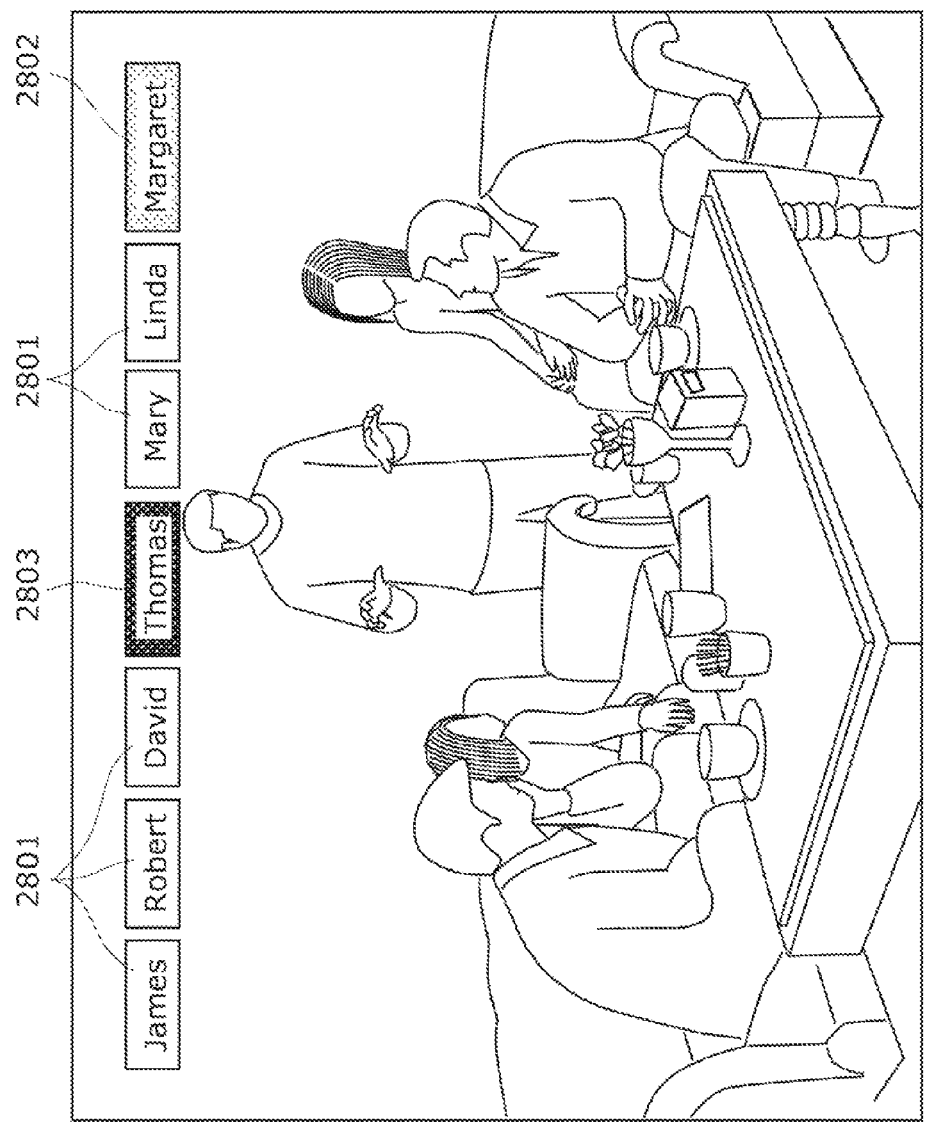

CONTENT PLAYBACK DEVICE AND CONTENT PLAYBACK METHOD

TECHNICAL FIELD

The present invention relates to content playback devices and content playback methods.

BACKGROUND OF INVENTION

Background Art

A technique regarding a player device is disclosed (for example, Patent Literature (PTL) 1) which can provide a user with metadata in addition to video data, and display relation information and track information of an object (a person or an item) which appears in a video on the next to a moving image or display such information superimposed on a moving image.

Furthermore, a type of service for displaying, on a tablet terminal placed in a kitchen and a television for use in a kitchen, recipe service for presenting a recipe to a user is now being used. For such service, a technique regarding a cooking recipe proposal device is disclosed (for example, PTL 2) which can select ingredients for which the same cookware can be used as repeatedly as possible when proposing a plurality of recipes.

CITATION LIST

Patent Literature

[PTL 1] Japanese Unexamined Patent Application Publication No. 2007-174477
[PTL 2] Japanese Unexamined Patent Application Publication No. 2010-211747

SUMMARY OF INVENTION

However, there is a problem that a user does not know appearance information of an object which appears in content during playback of the content.

The present invention provides a video playback device which appropriately presents appearance information of an object which appears in content while playing the content, and others.

A content playback device according to an aspect of the present invention includes: a playback unit configured to play content having plural scenes; an object appearance information acquisition unit configured to acquire, for each of the plural scenes, object appearance information of each of one or more objects which appear in the content by analyzing metadata which includes appearance scene data for identifying the one or more objects appearing in at least one of the scenes, the object appearance information indicating whether the object appears at least in or after the scene; and a presentation unit configured to present the object appearance information acquired for a scene being played, when the playback unit is playing the content.

It should be noted that these general and specific aspects may be implemented using a system, a method, an integrated circuit, a computer program, a computer-readable recording medium such as a CD-ROM, or any combination of systems, methods, integrated circuits, computer programs and recording media.

A content playback device according to the present invention can appropriately present appearance information of an object which appears in content while playing the content.

BRIEF DESCRIPTION OF DRAWINGS

FIG. 3 illustrates an example of a data structure of metadata.
FIG. 4 illustrates a specific example of metadata.
FIG. 8 illustrates examples of application to a recipe video; (scenes 1 and 2) in Embodiment 1.
FIG. 10 illustrates examples of application to the recipe video (scenes 5 and 6) in Embodiment 1.
FIG. 11 illustrates examples of application to the recipe; video (scenes 7 and 8) in Embodiment 1.
FIG. 14A illustrates a specific example of recipe data,
FIG. 14B illustrates a specific example of cookware information.
FIG. 16A illustrates cookware information.
FIG. 16B illustrates the cookware putting-away determination table.
FIG. 16C illustrates a cookware use status table.

FIG. 27 illustrates an example of screen display of the content playback device according to Variation 2 of Embodiment 2.

FIG. 28 illustrates an example of screen display of a content playback device which plays drama as content.

Figure 1:
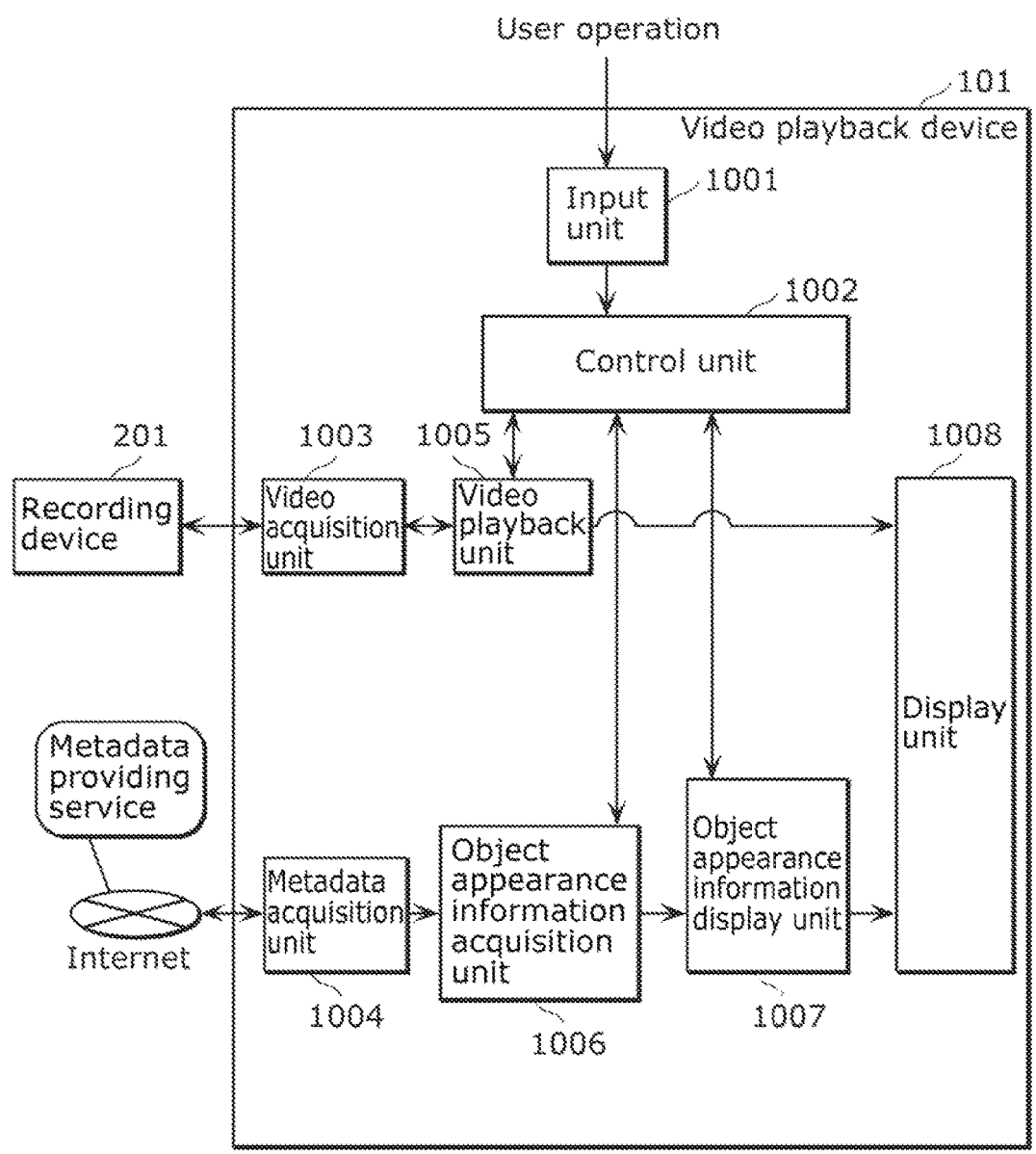
FIG. 1 is a block diagram illustrating a configuration of a video playback device according to Embodiment 1.

DETAILED DESCRIPTION Of INVENTION (Underlying Knowledge Forming Basis of the Present Invention)

The inventors have found that a method of presenting appearance information of an object mentioned in the "Background Art" has the following problems.

In recent years, a service and a system are provided for searching for information on details introduced in a digital television program after the program is broadcast. A viewer stores content delivered by digital television broadcasting in a home recording device, and a program producer provides as metadata, information added as an index (program index) to a scene in the video content, using the Internet, for instance. Utilizing the stored content and the metadata, the viewer can watch the stored video content after the content is broadcast, check a product and a shop introduced in the program, and use automatic search for details of the recorded program and a scene of interest.

A technique regarding a player device is disclosed (for example, PTL 1) which distributes metadata with video data to a user, and display relationship information and track information of an object which appears in video (a person or an item, for instance) next to a moving image, or displays such information superimposed on a moving image. According to the technique disclosed by PTL 1, an object name and information on a relationship between objects acquired from metadata are presented on a screen, thereby allowing a user to grasp the video with ease. Also, the user can be informed of a relationship between appearing objects, through all the scenes in the video.

On the other hand, in the cooking field, many functions are added in recent years to cooking appliances such as a microwave and a microwave oven, thus increasing convenience. A type of service for displaying, on a tablet terminal placed in a kitchen and a television for use in a kitchen, recipe service for presenting a recipe to a user is now being used. For such a service, a technique regarding a cooking recipe proposal device is disclosed which can select ingredients for which the same cookware can be used as repeatedly as possible when proposing a plurality of recipes (for example, PTL 2). The technique disclosed by PTL 2 reduces, as an effect, work for preparing, washing, and putting back cookware by proposing a recipe for which the same cookware can be used as repeatedly as possible.

However, if a user cooks, watching video content showing a cooking procedure, a cooking space gets cluttered, which prevents the user from efficiently cooking. This is because when the user is watching a certain scene of video content showing a cooking procedure, the user does not know whether the cookware used in the scene will also be used in a later scene, and thus the user cannot determine whether he/she can put away the cookware.

Not only vide content which shows a cooking procedure, but also general video content has a problem similar to the above. As a specific example, there is a problem that when watching drama or movie content, a user cannot efficiently watch a scene of interest. That is because, a user who watches drama or movie content for the purpose of watching a scene in which a specific person or item appears does not know information indicating whether the person and the item of interest appear after a certain scene (appearance information). As a result, the user watches the following scenes even though the person and the item of interest do not appear in the scenes after the certain scene, and thus the user cannot use time efficiently.

In view of this, an issue to be addressed is to improve user convenience by presenting to a user appearance information of a person and an item appearing in content while playing the content.

To address this issue, if the technique disclosed by PTL 1 is used, a user can be informed of a relationship between appearing objects, through all the scenes in a video. However, information, for each scene, on an object which appears in the scene, information indicating whether an object appears in a later scene, and the like cannot be presented. Therefore, the technique disclosed in PTL 1 does not solve the above-mentioned issue.

Furthermore, to address this issue, if the technique disclosed by PTL 2 is used, work for preparing, washing, and putting back cookware can be reduced as a result of proposing a recipe for which the same cookware can be used as repeatedly as possible. If this technique is applied to, for instance, a recipe shown using a video, it is not possible to reduce time and effort for putting away cookware used in scenes of video content. Therefore, the technique disclosed PTL 2 does not solve the above-mentioned issue, either.

The present invention has been conceived in order to solve the above issue, and an object thereof is to provide a content playback device which presents to a user appearance information of an object which appears in content while playing the content.

In order to solve the above issue, a content playback device according to an aspect of the present invention includes: a playback unit configured to play content having plural scenes; an object appearance information acquisition unit configured to acquire, for each of the plural scenes, object appearance information of each of one or more objects which appear in the content by analyzing metadata which includes appearance scene data for identifying the one or more objects appearing in at least one of the scenes, the object appearance information indicating whether the object appears at least in or after the scene; and a presentation unit configured to present the object appearance information acquired for a scene being played, when the playback unit is playing the content.

Accordingly, the user can be notified, when watching a certain scene of content, whether an object (a person or an item) appears in a scene after a certain scene, and can take a next action, based thereon. Thus, the content playback device can increase user convenience.

For example, the playback unit may be configured to play the content having the plural scenes which show details of cooking in plural cooking processes for a dish, and the object appearance information acquisition unit may be configured to acquire, for each of the plural scenes, the object appearance information of each of the one or more objects which are cookware used for cooking in at least one of the plural cooking processes.

Accordingly, when playing content regarding cooking, the content playback device applies an "object which appears in content" to "cookware used in the content being played", thereby notifying a user of when to put away the cookware, and allowing the user to effectively use a kitchen space while cooking.

Furthermore, as another example, when playing content such drama and sport content, the content playback device applies an "object" to an "actor or a sport player of interest in content being played", thereby informing the user of whether the actor or the sport player of interest is currently appearing and will also appear in a later scene, and allowing the user to select only a scene of interest and watch the scene.

For example, the content playback device may further include a storage unit configured to store as the content, for each of the plural cooking processes, cooking process information indicating details of the cooking process and cookware information indicating cookware used for cooking in the cooking process, the cooking process information being associated with the cookware information, wherein the playback unit may be configured to play the content stored in the storage unit, the object information acquisition unit may be further configured to determine, for each of the one or more objects, a last appearance scene in which the object appears last in the content, and based on a relationship between a scene and the last appearance scene, the presentation unit may be configured to present, for each of the one or more objects, information indicating the relationship at a position corresponding to the object, when the playback unit is playing the scene.

Accordingly, the content playback device displays content of cooking, and displays information on the last appearance scene of an object. If the user cooks, watching, for example, content showing a cooking procedure on the content playback device, the user can wash and put away the cookware after the last scene in which certain cookware appears. As another example, if the user watches drama or movie content for the purpose of watching a scene in which a particular person or an item appears, the user can stop watching the content after the last scene in which the particular person or object appears. Thus, user convenience can be increased.

For example, when the playback unit is playing a scene, the presentation unit may be configured to display a first message at a position corresponding to, among the one or more objects, an object for which a scene previous to the scene is the last appearance scene.

Accordingly, the content playback device can display a message intuitively showing to a user an object which does not appear after this scene in the content. If the user cooks, watching, for example, content showing a cooking procedure on the content playback device, the user can be intuitively informed of the last scene in which certain cookware appears. Then, the user can wash and put away that cookware after the scene.

For example, the object information acquisition unit may be further configured to determine, for each of the one or more objects, a first appearance scene in which the object appears first in the content, and when the playback unit is playing a scene, the presentation unit may be configured to display a second message at a position corresponding to, among the one or more objects, an object for which a scene following the scene is the first appearance scene.

Accordingly, the content playback device can display a message intuitively showing to a user an object which appears first in the content in the following scene. If the user cooks, watching, for example, content showing a cooking procedure on the content playback device, the user can be intuitively informed of the first scene in which certain cookware appears. Then, the user can make the cookware ready for use before the scene.

For example, the presentation unit may be configured to present the object appearance information of all the one or more objects which appear in the content, at a point in time when playback of the content is started.

Accordingly, the user can be informed of all the objects which appear in the content, immediately after he/she starts watching the content, and get ready for an action to take while watching the content. As an example, if the user cooks, watching content showing a cooking procedure, all the cookware to be used are displayed, and the user can make the cookware ready for use. As another example, if the user watches drama or movie content for the purpose of watching a scene in which a particular person or an item appears, the user can determine whether the particular person or item appears in the content. Thus, user convenience can be increased.

For example, the presentation unit may be configured to present the object appearance information of each of the one or more objects, by displaying a character string showing a name of the object in a mode according to the object appearance information.

Accordingly, the user can be aware of whether the object appears at least in or after a current scene, during the playback of the content. Thus, user convenience can be increased.

For example, the presentation unit may be configured to present the object appearance information of each of the one or more objects, by displaying a character string showing a name of the object in at least one of a color, a shape, and a size according to the object appearance information.

Accordingly, the user can be visually aware of tether the object appears at least in or after a current scene, during the playback of the content. Thus, user convenience can be increased.

For example, the presentation unit may be configured to present the object appearance information of each of the one or more objects, by displaying an icon which is a design symbolically representing the object in a mode according to the object appearance information.

Accordingly, the user can be visually and intuitively aware of whether the object appears at least in or after a current scene, during the playback of the content. Thus, user convenience can be increased.

For example, the content playback device may further include an input unit configured to accept operation by a user watching the content, wherein the presentation unit may be configured to present information relevant to, among the one or more objects, an object designated by the operation accepted by the input unit.

Accordingly, the user can acquire information relevant to a presented object by simple operation. Thus, user convenience can be increased.

For example, the information relevant to the designated object may be an image of the object.

Accordingly, after being visually aware of a presented object, the user can acquire information relevant to the object. Thus, user convenience can be increased.

For example, the presentation unit may be configured to present the object appearance information by displaying a character string showing the object appearance information in a balloon.

Accordingly, during the playback of the content, the user can be aware of whether a certain object appears at least in or after the scene with ease by a balloon displayed simultaneously with the video content. Thus, user convenience can be increased.

For example, the presentation unit may be configured to present the object appearance information by outputting the object appearance information by sound.

Accordingly, the user can be aware of whether a certain object appears at least in or after a current scene, during the playback of the content by hearing it as a sound. Thus, user convenience can be increased.

For example, when the presentation unit outputs the object information, the playback unit may be configured to pause playback of the content, and resume the playback after a predetermined time period.

Accordingly, the user can take a next action on an object whose last appearance scene is over. As an example, if a user cooks, watching content showing a cooking procedure, playback is paused immediately after the last scene in which certain cookware appears. The user can wash and put away the cookware at this time. Thus, user convenience can be increased.

For example, the content may be video content showing a cooking procedure, and the one or more objects may be cookware used in the cooking procedure.

For example, the information relevant to the designated object may be an ingredient cooked using cookware shown by the object.

For example, the information relevant to the designated object may be information on a cooking process in which cookware shown by the object is used.

For example, for each of the plural scenes, the object appearance information acquisition unit may be configured to acquire the object appearance information of each of the one or more objects which appear in the content by analyzing the metadata, the object appearance information indicating (i) whether the object appears at least in or after the scene, and (ii) whether the object appears in the scene.

For example, for each of the plural scenes, the object appearance information acquisition unit may be further configured to acquire the object appearance information of each of the one or more objects which appear in the content by analyzing the metadata, the object appearance information indicating whether the object appears in a scene following the scene.

A content playback method according to an aspect of the present invention includes: playing content having plural scenes; acquiring, for each of the plural scenes, object appearance information of each of one or more objects which appear in the content by analyzing metadata which includes appearance scene data for identifying the one or more objects appearing in at least one of the scenes, the object appearance information indicating whether the object appears after the scene; and presenting the object appearance information acquired for a scene being played, when the playback unit is playing the content.

This achieves the same effect as the above content playback device.

It should be noted that these general and specific aspects may be implemented using a system, a method, an integrated circuit, a computer program, a computer-readable recording medium such as a CD-ROM, or any combination of systems, methods, integrated circuits, computer programs or recording media.

The following describes embodiments of the present invention using drawings.

It should be noted that each embodiment described in the following shows a general or specific example. The numerical values, shapes, materials, constituent elements, the arrangement and connection of the constituent elements, steps, the processing order of the steps and the like described in the following embodiments are mere examples, and thus do not limit the scope of the appended Claims. Therefore, among the constituent elements in the following exemplary embodiments, constituent elements not recited in any of the independent claims defining the most generic part of the inventive concept are described as arbitrary constituent elements.

It should be noted that the same numerals may be given to the same constituent elements, and a description thereof may be omitted.

[Embodiment 1]

In Embodiment 1, an example is shown of a video playback device which presents whether an object which appears in video content (a person or an item) appears in a scene after a scene that is being played. It should be noted that a video playback device according to the present embodiment corresponds to a content playback device. Furthermore, a "scene" corresponds to one portion obtained when content is divided into a plurality of portions at separation of situations or settings. In short, a scene is one portion of content and is a portion showing one situation or one setting.

FIG. 1 is a block diagram illustrating a configuration of a video playback device 101 according to the present embodiment.

As illustrated in FIG. 1, the video playback device 101 according to the present embodiment includes an input unit 1001, a control unit 1002, a video acquisition unit 1003, a metadata acquisition unit 1004, a video playback unit 1005, an object appearance information acquisition unit 1006, an object appearance information display unit 1007, and a display unit 1008. It should be noted that a combination of functions of the object appearance information display unit 1007 and the display unit 1008 corresponds to a presentation unit.

FIG. 1 further illustrates a recording device 201 connected to the video playback device 101.

The input unit 1001 accepts user operation.

The control unit 1002 notifies the video playback unit 1005 of a playback start request, in accordance with the user operation accepted by the input unit 1001. The control unit 1002 has a timer function, and manages elapsed time from a playback start time.

The video acquisition unit 1003 transmits a content request to the recording device 201, and receives content from the recording device 201.

The metadata acquisition unit 1004 acquires metadata in accordance with a metadata acquisition start request.

The video playback unit 1005 acquires video content in accordance with a video content acquisition start request, and plays video content in accordance with the playback start request for the video content, and transmits display data to the display unit. It should be noted that the video playback unit 1005 corresponds to a playback unit.

The object appearance information acquisition unit 1006 acquires object appearance information from information on metadata.

The object appearance information display unit 1007 transmits object appearance information display data to the display unit 1008 in accordance with an object appearance information presentation start request. Furthermore, if object appearance information is updated, the object appearance information display unit 1007 transmits new object appearance information display data to the display unit 1008.

The display unit 1008 superimposes the object appearance information display data received from the object appearance information display unit 1007 on video content display data received from the video playback unit 1005, and displays the resultant data.

Figure 2:
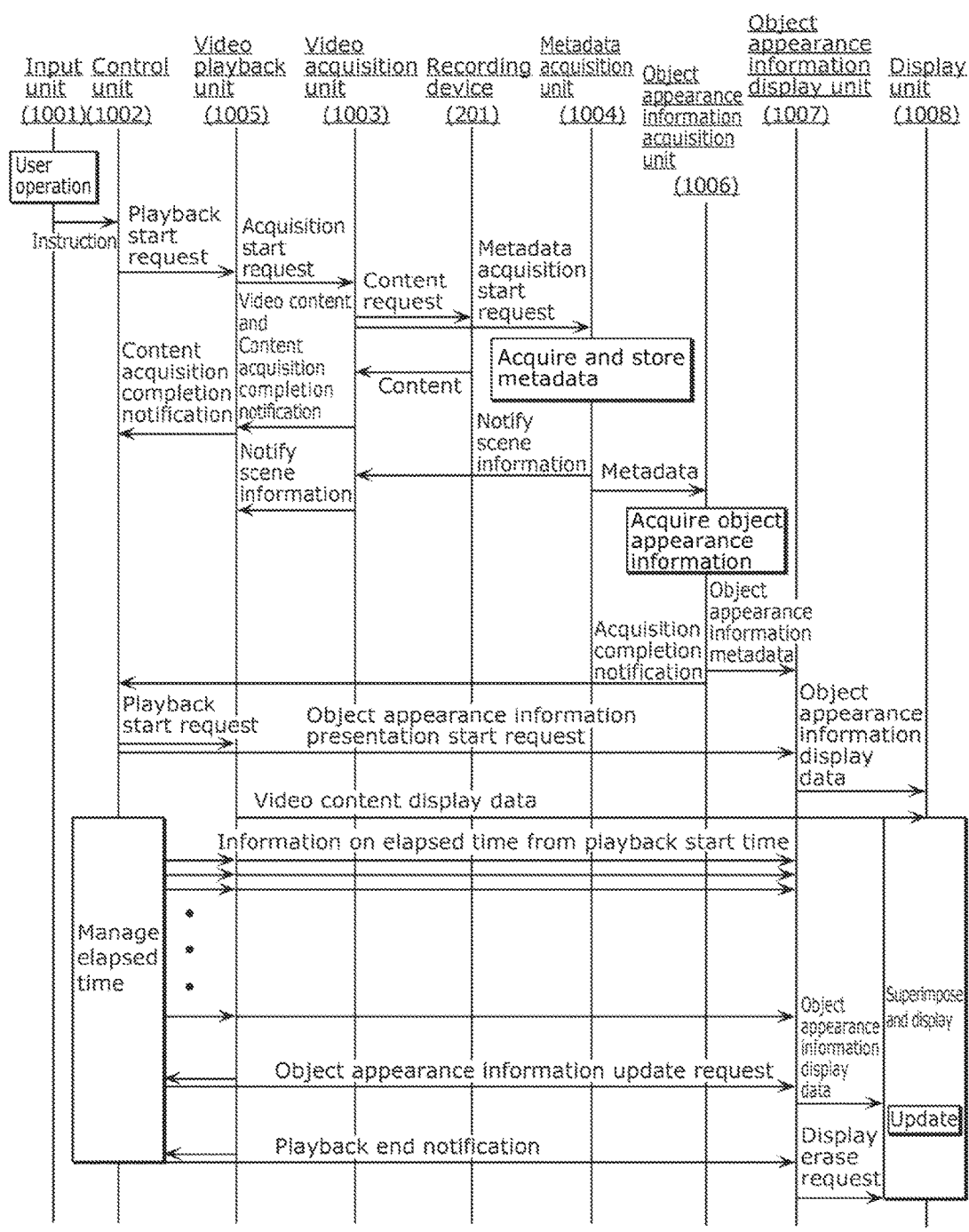
FIG. 2 is a sequence diagram illustrating operation of functional blocks of the video playback device according to Embodiment 1.

FIG. 2 is a sequence diagram illustrating operation of functional blocks of the video playback device 101 according to the present embodiment. A description is given of operation of the functional blocks of the video playback device 101 using FIG. 2.

The recording device 201 can receive a digital broadcast, record program data which includes the received video content, and output the recorded program data.

The input unit 1001 accepts user operation. Examples of user operation include a key operation on the video playback device, and the like. In addition, user operation may be remote control operation if the video playback device 101 has an infrared ray receiving unit. User operation may be touch operation if the video playback device 101 has a touch panel. User operation may be gesture operation if the video playback device 101 has a distance sensor or a temperature sensor, for instance. The input unit 1001 notifies the control unit 1002 of information on video content designated by accepted operation as an instruction.

Upon receipt of the instruction from the input unit 1001, the control unit 1002 notifies the video playback unit 1005 of a playback start request for video content included in the instruction (a signal indicating a request for starting processing of playing the video content).

Upon receipt of the playback start request for the video content from the control unit 1002, the video playback unit 1005 notifies the video acquisition unit 1003 of an acquisition start request for the designated video content (a signal indicating a request for a start of acquiring the content).

Upon receipt of the acquisition start request for the video content from the video playback unit 1005, the video acquisition unit 1003 acquires the designated video content from the recording device 201, and furthermore notifies the metadata acquisition unit 1004 of a metadata acquisition start request for metadata of the designated video content (a signal indicating a request for a start of acquiring metadata). For the video acquisition unit 1003 to acquire video content from the recording device 201, a configuration may be adopted in which the video acquisition unit 1003 designates video content, and transmits a content request to the recording device 201, and in response to the request, the recording device 201 transmits the video content to the video acquisition unit 1003.

Here, metadata includes data for determining one or more objects which appear in at least one scene of video content which includes plural scenes.

Upon completion of acquiring the video content, the video acquisition unit 1003 notifies the video playback unit 1005 of a content acquisition completion notification, and furthermore transmits video content data to the video playback unit 1005. Upon receipt of the content acquisition completion notification, the video playback unit 1005 notifies the control unit 1002 of that content acquisition completion notification.

Upon receipt of the metadata acquisition start request from the video acquisition unit 1003, the metadata acquisition unit 1004 accesses a metadata providing service or the like via the Internet, and acquires metadata corresponding to the designated video content. It should be noted that the metadata acquisition unit may include a storage device, and store therein acquired metadata. In that case, if the metadata to be acquired is already stored in the metadata acquisition unit 1004, the metadata acquisition unit 1004 performs subsequent processing using the stored metadata, without accessing a metadata providing service.

Next, the metadata acquisition unit 1004 notifies the video acquisition unit 1003 of scene information (start time and end time of each scene) described in the acquired metadata. Upon notification of the scene information, the video acquisition unit 1003 notifies the video playback unit 1005 of the scene information. The metadata acquisition unit 1004 outputs the acquired metadata to the object appearance information acquisition unit 1006.

For each scene of video content, the object appearance information acquisition unit 1006 acquires object appearance information of each object which appears in at least one scene of the video content, indicating whether the object appears at least in or after the scene, by analyzing metadata.

Based on information described the metadata, the object appearance information acquisition unit 1006 determines, for each scene of the video content, which of the following three types corresponds to each object, namely, object appearance information of an object which appears in the scene, object appearance information of an object which does not appear in the scene, but appears in a scene after the scene, and object appearance information of an object which does not appear in the scene and does not appear in a scene after the scene.

Furthermore, upon completion of acquiring object appearance information, the object appearance information acquisition unit 1006 transmits the object appearance information and the metadata to the object appearance information display unit 1007, and notifies the control unit 1002 of an acquisition completion notification.

Upon receipt of both the content acquisition completion notification from the video playback unit 1005 and the acquisition completion notification from the object appearance information acquisition unit 1006, the control unit 1002 again notifies the video playback unit 1005 of a playback start request for the video content (signal indicating a request for a start of the playback), and also notifies the object appearance information display unit 1007 of an object appearance information presentation start request (signal indicating a request for a start of presenting object appearance information).

Upon receipt of the playback start request for the video content, the video playback unit 1005 starts playing the video content, and outputs video content display data which indicates a video to be played to the display unit 1008.

Upon receipt of the object appearance information presentation start request, the object appearance information display unit 1007 outputs object appearance information display data to the display unit 1008.

The display unit 1008 superimposes the object appearance information display data received from the object appearance information display unit 1007 on the video content display data received from the video playback unit 1005, and displays the resultant data.

The control unit 1002 manages elapsed time from the playback start time of the video content while the video playback unit 1005 is the playing video content, and successively notifies the video playback unit 1005 and the object appearance information display unit 1007 of information on the elapsed time from the playback start time.

When the time has come to a time at which a played scene of the video content transitions, the video playback unit 1005 notifies the control unit 1002 of an object appearance information update request (a signal indicating a request for updating object appearance information display). Upon notification of the object appearance information update request, the control unit 1002 notifies the object appearance information display unit 1007 of the object appearance information update request. Here, a time at which a scene transitions means a playback start time, or an end time of a currently played scene and a start time of a next scene.

Upon receipt of the object appearance information update request, the object appearance information display unit 1007 outputs object appearance information display data to the display unit 1008. Upon receipt of the object appearance information display data, the display unit 1008 updates the display by displaying new object appearance information display data. As a result, the newest object appearance information is displayed, being superimposed on the video content.

The video playback unit 1005 ends playback when the video playback unit 1005 finishes playing the video content at the end (when the finish time of the video content comes), and notifies the control unit 1002 of the end of the playback by transmitting a playback end notification. Upon receipt of the playback end notification, the control unit 1002 notifies the object appearance information display unit 1007 of that playback end notification. Upon receipt of the playback end notification, the object appearance information display unit 1007 notifies the display unit 1008 of a display erase request (a signal indicating a request for erasing display).

According to such a configuration, based on metadata acquired by the metadata acquisition unit 1004, the object appearance information acquisition unit 1006 determines, for each scene of the video content, which of the following three types corresponds to each object, namely, object appearance information of an object which appears in the scene, object appearance information of an object which does not appear in the scene, but appears in a scene after the scene, and object appearance information of an object which does not appear in a scene after the scene. Then, the display unit 1008 superimposes object appearance information display output by the object appearance information display unit 1007 on video content played by the video playback unit 1005.

It should be noted that although there are three types of object appearance information in the present embodiment, the types of object appearance information may be two, namely, appearance information for an object which appears at least in or after a current scene and appearance information for an object which does not appear in and after the current scene.

Accordingly, for example, when video content of a cooking program is played, it is possible to present to a user, in each cooking process for a dish, cookware used in the currently played cooking process, cookware which is not used in the currently played cooking process, but appears after the currently played cooking process, and cookware not used in and after the currently played cooking process. Thus, when to put away cookware can be shown to a user with visual clarity when the user cooks, watching video content.

Although it is stated in the present embodiment that the recording device 201 receives a digital broadcast, content data outputted from, for instance, an external content transmission device such as a video content server may be inputted, rather than a broadcast is input.

Although it is stated that the recording device 201 can receive a digital broadcast, record the received program, and output the recorded video content, an Internet network or a video content server present in a home may be used, for example. Furthermore, a device which can record and output video content can be substituted for the recording device 201 described in the present embodiment.

Furthermore, although an example is used in which the recording device 201 is connected to the outside, the video playback device 101 may have a function equivalent to that of the recording device.

Although it is stated that the metadata acquisition unit 1004 accesses a metadata providing service, for instance, via the Internet, and acquires metadata corresponding to a designated video content, data including service information (SI) data in digital broadcast waves received by the recording device 201 may be acquired as metadata, for example. Metadata may be previously stored as data in a video content server mentioned above or the like together with video content, and that data may be acquired as metadata.

Although it is stated that the metadata acquisition unit 1004 accesses a metadata providing service or the like via the Internet, and acquires metadata corresponding to a designated video content, the metadata acquisition unit 1004 may have a function of acquiring text information described in a web site in cooperation with video content and extracting scene information and object information of each object which appears in at least one scene from the text information, and may use the information as metadata, for example.

Although it is stated that the control unit 1002 has a timer function, manages elapsed time from a playback start time, and successively notifies the video playback unit 1005 and the object appearance information display unit 1007 of information on the elapsed time from the playback start time, time stamp information included in video content may be used as the elapsed time information.

FIG. 3 illustrates an example of a data structure of metadata. As illustrated in FIG. 3, the data structure of metadata includes (a) metadata 10001, (b) scene information 10002, (c) object information 10003, and (d) ingredient information 10004.

The metadata 10001 includes a "metadata ID" item for uniquely identifying metadata, a "video ID" item uniquely indicating video content, a "scene count" item indicating the number of scenes included in the video content, a "scene ID list" item in which scene IDs of the plural scenes included in the video content are listed chronologically. It is assumed that a different video ID is assigned to each video content. This metadata allows metadata of video content corresponding to a given video ID to be uniquely identified. Here, although an example is given in which only one metadata is present for one video content, plural metadata may be present for one video content.

The scene information 10002 includes a "scene ID" item for uniquely identifying a scene, a "start time" item indicating the start time of the scene, an "end time" item indicating the end time of the scene, an "object count" item indicating the number of objects which appear in the scene, and an "object ID list" item in which object IDs of objects which appear in the scene are listed. The number of the scene information 10002 included for one metadata 10001 at least corresponds to the number indicated by the "scene count" item of the metadata 10001.

The object information 10003 includes an "object ID" item for uniquely identifying an object, a "name" item indicating the name of the object, an "explanation" item which describes an explanation of the object, an "icon data" item which is a design symbolically showing the object in order to uniquely identify the object and is data of an icon for uniquely identifying the object, and an "image" item showing an image for explaining or representing the object. In addition, the object information 10003 may include an "ingredient count" item indicating the number of ingredients cooked using cookware designated by the object, and an "ingredient ID list" item in which ingredients cooked using the cookware designated by the object are listed. The number of the object information 10003 included for one scene information 10002 at least corresponds to the number shown in the "object count" item of the scene information 10002. Furthermore, the number of the object information 10003 included for one metadata 10001 at least corresponds to a total number of objects which appear in the video content.

FIG. 4 illustrates a specific example of metadata. Metadata illustrated in (a) of FIG. 4 indicates that a video corresponding to this metadata has eight scenes, namely, A, B, C, D, E, F, G, and H. Further, as illustrated in (b) of FIG. 4, the start time of scene A is 00:00:00 (which is the same as the start time of video content), the end time is 00:01:00, and two objects P and Q (object IDs are P and Q, respectively) appear in scene A, for example. The start and end times of scene B to scene H and others are as illustrated in the drawing. Furthermore, (c) of FIG. 4 illustrates correspondences between object IDs and the names of objects. For example, object P is a kitchen knife. The names of objects Q, R, and S and T are as illustrated in the drawing.

Figure 6:
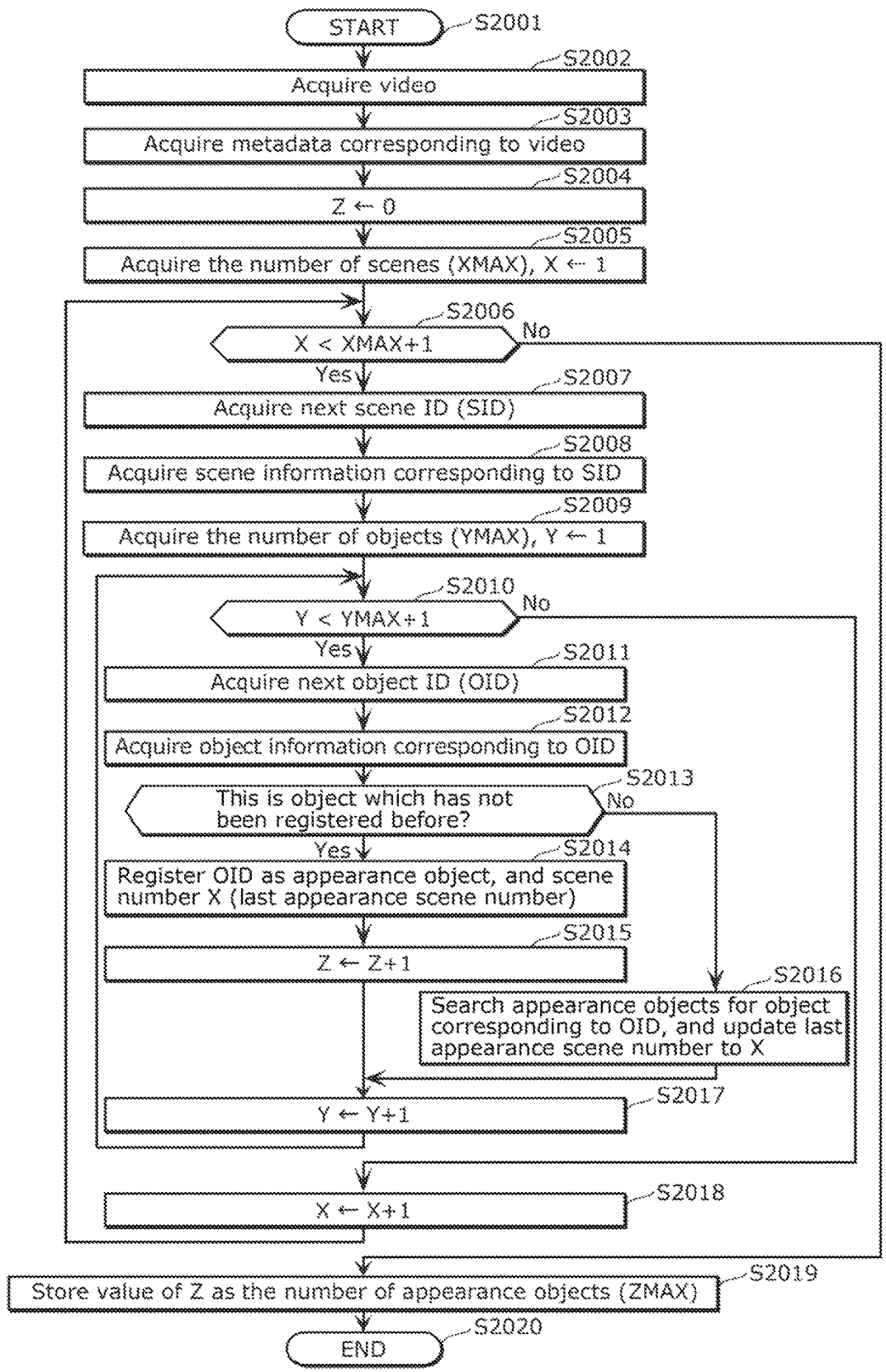
FIG. 6 illustrates a flow of control regarding object appearance information detection by the video playback device according to Embodiment 1.

FIG. 6 illustrates the flow of control regarding object appearance information detection by the video playback device 101 according to the present embodiment.

In FIG. 6, first, a user gives an instruction to play desired video content, thereby starting object appearance information detection processing (S2001). Upon receipt of the instruction from the input unit 1001, the control unit 1002 notifies the video playback unit 1005 of an acquisition start request for the designated video content included in the instruction.

Upon receipt of a playback start request for the video content from the control unit 1002, the video playback unit 1005 notifies the video acquisition unit 1003 of the acquisition start request for the designated video content.

Upon receipt of the acquisition start request for the video content from the video playback unit 1005, the video acquisition unit 1003 acquires the designated video content from the recording device 201 (S2002), and furthermore notifies the metadata acquisition unit 1004 of a metadata acquisition start request for metadata of the designated video content. Upon receipt of the metadata acquisition start request from the video acquisition unit 1003, the metadata acquisition unit 1004 accesses a metadata providing service or the like via the Internet, and acquires the metadata corresponding to the designated video content (S2003). Here, the relationship between the designated video content and the metadata thereof is determined in metadata. For example, in the metadata 10001 illustrated in (a) of FIG. 4, a video designated by a video ID and metadata designated by a metadata ID are associated with each other. The metadata acquisition unit 1004 outputs the acquired metadata to the object appearance information acquisition unit 1006.

Next, the object appearance information acquisition unit 1006 initializes, to 0, Z denoting the number of all the objects (appearance objects) which appear in at least one of all the scenes (the number of appearance objects) (S2004).

Next, the object appearance information acquisition unit 1006 acquires the number of scenes (XMAX) from metadata by checking the "scene count" item of the metadata 10001, and also sets the scene number (X) to 1 (S2005). In the subsequent steps, the processing below is performed for each (scene number X) of all the scenes indicated by XMAX.

Next, the object appearance information acquisition unit 1006 determines whether processing has been performed for all the scenes, and if the processing has not been performed for all the scenes, the procedure proceeds to the processing for the remaining scenes. On the other hand, if the processing has been performed for all the scenes, the procedure proceeds to the next processing. Specifically, processing proceeds to step S2007 if X is smaller than (XMAX+1), and proceeds to step S2019 in other cases (S2006).

Next, the object appearance information acquisition unit 1006 acquires an Xth scene ID (SID) among scene IDs described in the scene ID list item of the metadata 10001 (S2007).

Next, the object appearance information acquisition unit 1006 acquires scene information corresponding to the SID (S2008). For example, the object appearance information acquisition unit 1006 acquires scene information 10002 having the same scene. ID as the SID from the scene information 10002 illustrated in FIG. 4.

Next, the object appearance information acquisition unit 1006 acquires the number of objects (YMAX) from the scene information by checking the "object count" item of the scene information 10002, and sets the object number (Y) to 1 (S2009).

Next, the object appearance information acquisition unit 1006 determines whether processing has been performed for all the objects, and if processing has not been performed for all the objects, the procedure proceeds to the processing for the remaining objects. On the other hand, if processing for all the objects has been performed, the procedure proceeds to the next processing. Specifically, the processing proceeds to step S2011 if Y is smaller than (YMAX+1), and proceeds to step S2018 in other cases (S2010).

Next, the object appearance information acquisition unit 1006 acquires a Yth object ID (OID) among objects ID described in the object ID list item of the scene information 10002 (S2011).

Next, the object appearance information acquisition unit 1006 acquires object information corresponding to the OID (S2012). For example, the object appearance information detection unit 1016 acquires object information 10003 having the same object ID as the OID from the object information 10003 illustrated in FIG. 4.

Next, the object appearance information acquisition unit 1006 performs processing of registration in an appearance object table.

Figure 5:
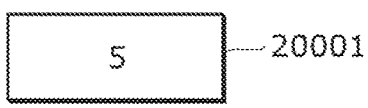
FIG. 5 illustrates an example of a structure of appearance object data.

First, a description is given of the structure of appearance object data using FIG. 5.

Appearance object data includes an appearance object count 20001 illustrated in (a) of FIG. 5 and an appearance object table 20002 illustrated in (b) of FIG. 5.

The appearance object count 20001 is a value indicating a total number of objects which appear in at least one scene.

The appearance object table 20002 is a table for collectively registering all the objects which appear in at least one scene. Data registered in the appearance object table 20002 has a two-dimensional arraying structure which includes indexes sequentially assigned to appearance objects from 0, and for each appearance object, an object ID of the appearance object and a scene number of a scene in which the object appears last (last appearance scene number). The appearance object table 20002 has nothing registered (the number of appearance objects is 0) until the object appearance information acquisition unit 1006 performs first registration after acquiring metadata. Each time the object appearance information acquisition unit 1006 extracts object appearance information and detects an object which appears, registrations are performed successively. In the state illustrated in FIG. 5, the appearance object count 20001 shows 5, and object IDs are P, Q, R, S, and T for indexes 0, 1, 2, 3, and 4 of appearance objects, respectively. Further, the last appearance scene numbers of the objects having the object IDs are 3, 3, 3, 7, and 6, respectively.

The object appearance information acquisition unit 1006 determines whether an object corresponding to an OID has not been registered in the appearance object table before (S2013). If the object has not been registered, the processing proceeds to step S2014, whereas the object has already been registered, the processing proceeds to step S2016.

If it is determined in step S2013 that the object has not been registered, the object appearance information acquisition unit 1006 registers the OID as an object ID of the appearance object, and registers X into the appearance object table as the last appearance scene number (S2014). Next, 1 is added to the value of Z (S2015), and the processing proceeds to step S2017.

On the other hand, if it is determined in step S2013 that the object has been registered before, the last appearance scene number for the registration object ID which is the same as the OID is updated to X, using the registration object table (S2016), and the processing proceeds to step S2017.

In step S2017, 1 is added to the value of Y, and the processing proceeds to step S2010.

If it is determined in step S2010 that Y is greater than or equal to (YMAX+1), 1 is added to the value of X (S2018) and the processing returns to step S2006.

If it is determined in step S2006 that X is greater than or equal to (XMAX+1), the value of Z is stored as the number of appearance objects (S2019), and the object appearance information detection processing ends (S2020).

Figure 7:
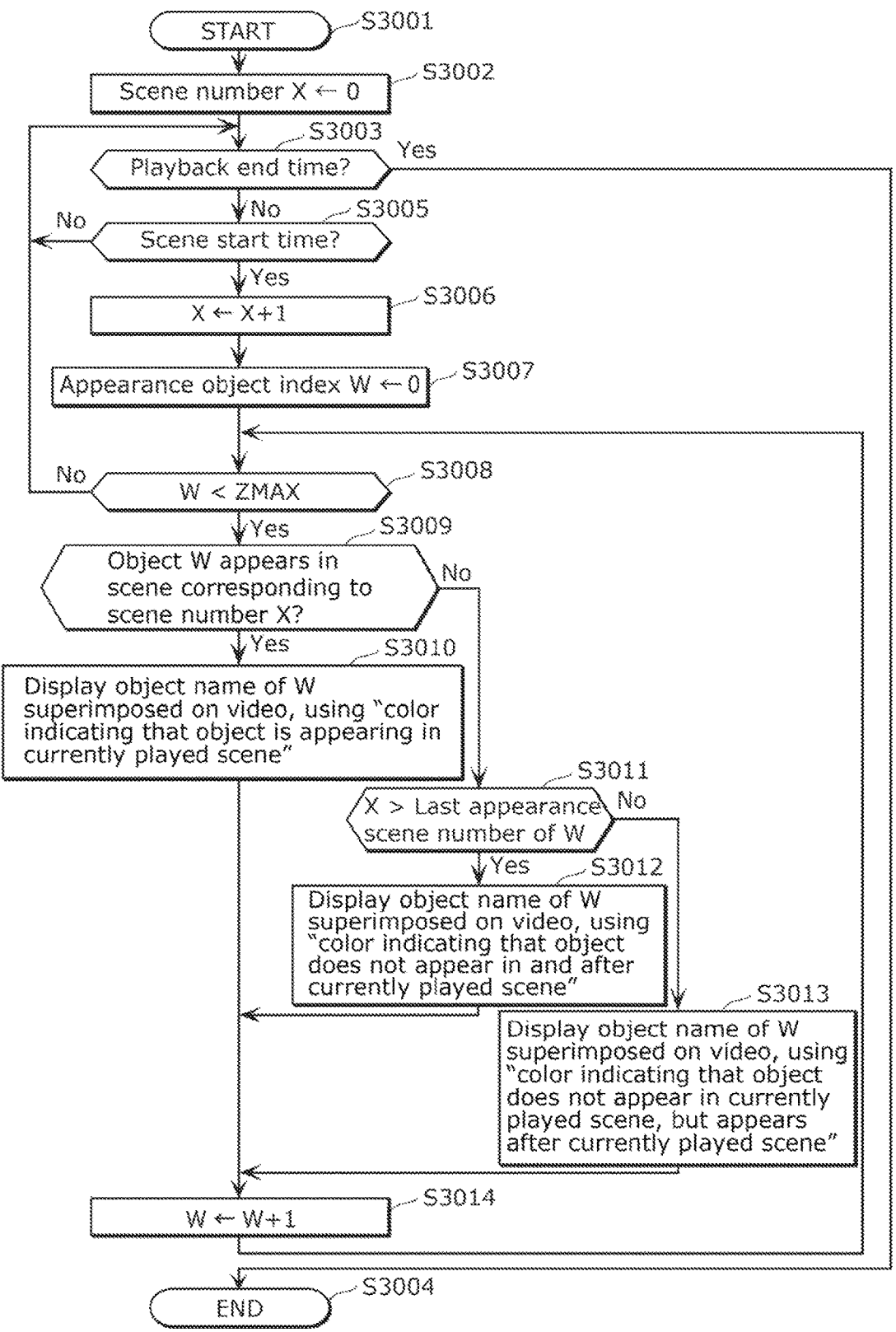
FIG. 7 illustrates a flow of control regarding object appearance information presentation by the video playback device according to Embodiment 1.

FIG. 7 illustrates the flow of control regarding object appearance information presentation by the video playback device according to the present embodiment.

In FIG. 7, the control unit 1002 receives both an acquisition completion notification for video content from the video playback unit 1005 and an acquisition completion notification for object appearance information from the object appearance information acquisition unit 1006, notifies the video playback unit 1005 of a playback start request for the video content, and furthermore notifies the object appearance information display unit 1007 of an object appearance information presentation start request, thereby starting object appearance information presentation processing (S3001).

First, the object appearance information display unit 1007 initializes the scene number (X) to 0 (S3002). X denotes the current scene number.

Next, the object appearance information display unit 1007 checks whether a playback end notification has been received from the control unit 1002, and determines whether the time has reached the playback end time of the video content (S3003). The object appearance information display unit 1007 ends display processing if the time has reached the playback end time (S3004), whereas the processing proceeds to step S3005 if the time has not reached the playback end time.

Next, the object appearance information display unit 1007 determines whether the time is a scene start time, based on elapsed time information from the control unit 1002 and start time information in the scene information 10002 (S3005). If the time is not a scene start time, the processing returns to step S3003. If the time is a scene start time, the processing proceeds to step S3006.

Next, the object appearance information display unit 1007 adds 1 to X (S3006), and initializes a value W indicating the index of an appearance object to 0 (S3007).

Next, if the object appearance information display unit 1007 determines that W is smaller than the number of appearance objects ZMAX, the processing proceeds to step S3009, whereas the processing returns to step S3003 in other cases (S3008).

In step S3009, the object appearance information display unit 1007 acquires an object ID indicated by the appearance object index W from the appearance object table, and determines whether the object ID is included in the object ID list in the scene information 10002 corresponding to an Xth scene ID in the scene ID list of the metadata 10001 (S3009). If the ID is included, the processing proceeds to step S3010, whereas if the ID is not included, the processing proceeds to step S3011.

In step S3010, the object appearance information display unit 1007 acquires an object ID indicated by the appearance object index W from the appearance object table, and refers to an object name in the object information 10003 corresponding to the object ID. Then, the object appearance information display unit 1007 outputs to the display unit 1008 display data for superimposing and displaying the object name using a color indicating that the object appears in a currently played scene. The display unit 1008 superimposes the display data on video content, and displays the resultant data (S3010). After that, the processing proceeds to step S3014.

In step S3011, the object appearance information display unit 1007 acquires the last appearance scene number indicated for the appearance object index W from the appearance object table, and determines whether that last appearance scene number is smaller than X (S3011). If the last appearance scene number is smaller than X, the processing proceeds to step S3012, whereas if the last appearance scene number is not smaller than X, the processing proceeds to step S3013.

In step S3012, the object appearance information display unit 1007 acquires an object ID indicated by the appearance object index W from the appearance object table, and refers to the object name in the object information 10003 corresponding to the object ID. Then, the object appearance information display unit 1007 outputs to the display unit 1008 data for superimposing and displaying the object name using a color indicating that the object does not appear after the currently played scene. The display unit 1008 superimposes the display data on the video content and displays the resultant data (S3012). After that, the processing proceeds to step S3014.

In step S3013, the object appearance information display unit 1007 acquires an object ID indicated by the appearance object index W from the appearance object table, and refers to the object name in the object information 10003 corresponding to the object ID. Then, the object appearance information display unit 1007 outputs to the display unit 1008 display data for superimposing and displaying the object name using a color indicating that the object does not appear in the currently played scene, but appears after the currently played scene. The display unit 1008 superimposes the display data on video content and displays the resultant data (S3013). After that, the processing proceeds to step S3014.

In step S3014, 1 is added to the appearance object index W (S3014), and the processing proceeds to step S3008.

It should be noted that the structure of the metadata is not limited to the structure illustrated, in FIG. 3 in the present embodiment. For example, metadata may include information which describes, for each of all the scenes of video content, an object which appears in the scene, an object which does not appear in the scene, but appears in a scene after the scene, and an object which does not appear in any scene after the scene, and object appearance information may be presented based on the information.

FIGS. 8, 9, 10, and 11 illustrate examples of application to a recipe video in the present embodiment.

FIGS. 8 to 11 illustrate an example of application to a cooking video for "stir-fried liver and oriental garlic (which is a dish cooked by stir-frying liver and oriental garlic)" as video content. The change of a display screen along with the progress of cooking is illustrated in schematic diagrams, namely, (a) of FIG. 8, (b) of FIG. 8 (a) of FIG. 9, (b) of FIG. 9, (a) of FIG. 10, (b) of FIG. 10, (a) of FIG. 11, and (b) of FIG. 11 in this stated order.

FIG. 4 illustrates a data structure of metadata of this example of application.

If the metadata in FIG. 4 is used, five cookware (a kitchen knife, a cutting board, a bowl, a frying pan, and a dish) are detected as appearance objects by the processing described using FIG. 6, and the appearance object data is as illustrated in FIG. 5.

Part (a) of FIG. 8 illustrates a display example in scene 1 "cut liver" immediately after the playback starts.

On the upper portion of the display screen, the names of all the cookware (a kitchen knife, a cutting board, a bowl, a frying pan, and a dish) used in video content are displayed. Further, cookware being used in a current scene, cookware not used in the current scene, but used in a scene thereafter, cookware not used in and after the current scene are displayed, being classified using preset colors. Here, cookware are classified using different colors, namely, "yellow" for cookware being used in the current scene, "green" for cookware not used in the current scene, but used in a scene thereafter, and "red" for cookware not used in and after the current scene.

In scene 1, the kitchen knife and the cutting board are used, and thus displayed in yellow. Furthermore, the bowl, the frying pan, and the dish are not used in the current scene, but will be used in a later scene in the video content, and thus are displayed in "green."

Part (b) of FIG. 8 illustrates a display example in scene 2 "dress liver." In scene 2, the bowl is being used, and thus displayed in "yellow." Furthermore, although the kitchen knife and the cutting board do not appear in this scene, but will appear again, and thus are displayed in "green." The frying pan and the dish are not used in the current scene, but will be used in a later scene in the video content, and thus are also displayed in "green."

Figure 9:
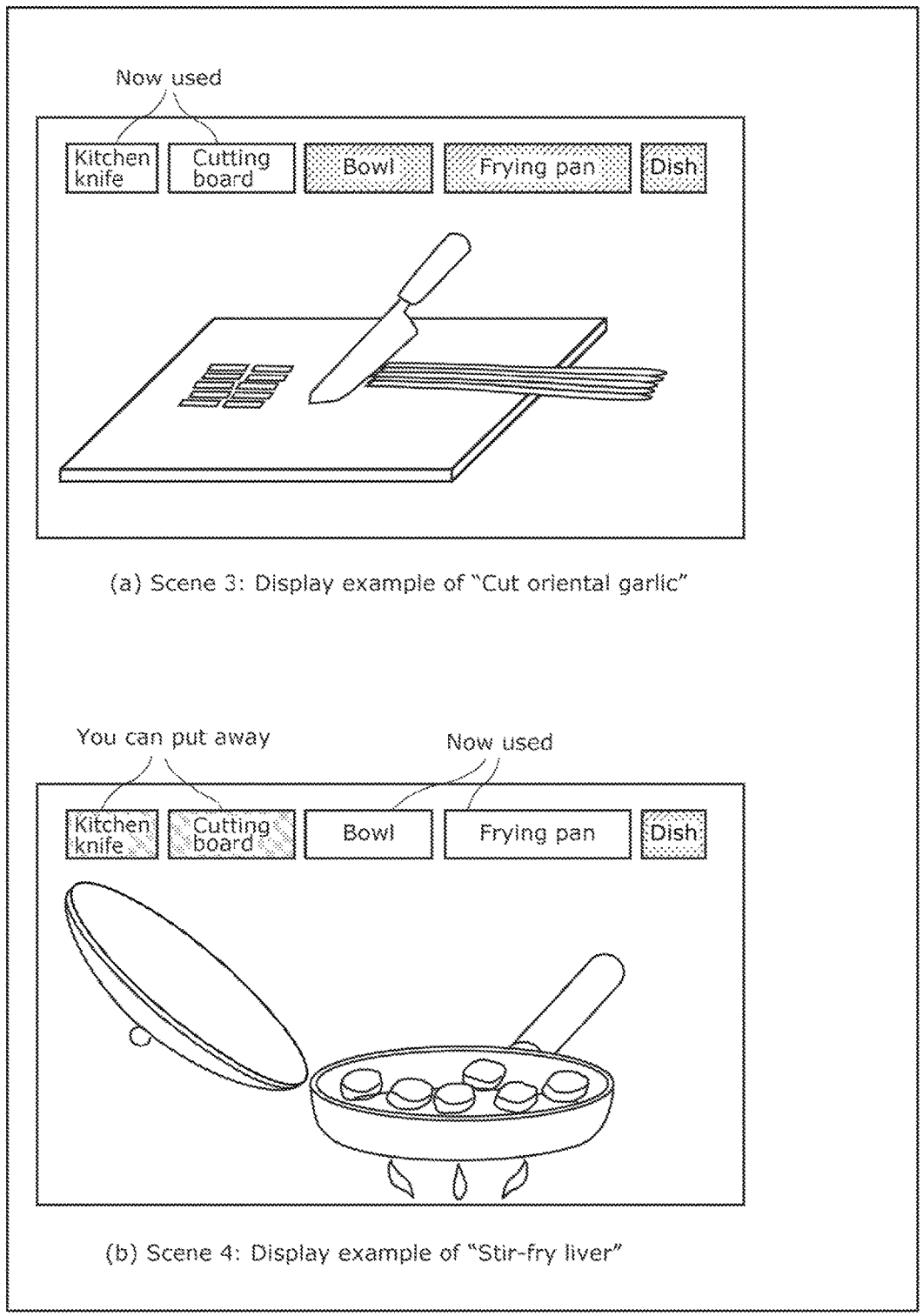
FIG. 9 illustrates examples of application to the recipe video (scenes 3 and 4) in Embodiment 1.

Part (a) of FIG. 9 illustrates a display example in scene 3 "cut oriental garlic". In scene 3, the kitchen knife and the cutting board are used again and thus displayed in "yellow." Furthermore, the bowl, the frying pan, and the dish are not used in the current scene, but will be used in a later scene, and thus displayed in "green."

Part (b) of FIG. 9 illustrates a display example in scene 4 "stir fry liver." In scene 4, the kitchen knife and the cutting board will not be used after this scene, and thus are displayed in "red." In other words, the user can be aware that the kitchen knife and the cutting board can be put away in or after this scene. Furthermore, the bowl and the frying pan are used in this scene, and thus displayed in "yellow." Furthermore, the dish is not used in the current scene, but will be used in a later scene in the video content, and thus is displayed in "green."

Part (a) of FIG. 10 illustrates a display example in scene 5 "put liver on dish." In scene 5, the kitchen knife and the cutting board will not be used after this scene, and thus are displayed in "red" as in scene 4. Furthermore, the bowl will not be used in and after this scene, and thus is also newly displayed in "red." The user can be aware that the bowl can be put away in or after this scene. Furthermore, the frying pan and the dish are used in this scene, and thus displayed in "yellow." It should be noted that cookware newly determined in the current scene to be put, away in or after the current scene may be highlighted, for instance, thereby presenting the cookware to the user with emphasis.

Part (b) of FIG. 10 illustrates a display example in scene 6 "stir-fry oriental garlic." In scene 6, the kitchen knife, the cutting board, and the bowl will not be used after this scene, and thus are displayed in "red" as in scene 5. Furthermore, the frying pan is used in this scene, and thus displayed in "yellow." Furthermore, the dish is not used in this scene, but will be used in a later scene in the video content, and thus is displayed in "green."

Part (a) of FIG. 11 illustrates a display example in scene 7 "add liver and stir-fry". In scene 7, the kitchen knife, the cutting board, and the bowl will not be used after this scene, and thus are displayed in "red" as in scene 6. Furthermore, the frying pan and the dish are used again in this scene, and thus displayed in "yellow."

Part (b) of FIG. 11 illustrates a display example in scene 8 "serve on plate (enjoy)." Cooking is all done in scene 8, and no cookware is used, and thus all the cookware are displayed in "red."

As described above, in the example of application to a recipe video, which cookware can be put away is presented visually in each scene, thus informing a user when he/she can put away which cookware. Thus, the user can put away the cookware while cooking.

As described above, the video playback device according to the present embodiment informs a user, when he/she is watching a certain scene of video content, whether an object (such as a person or an item) will appear in a scene after the certain scene, and thus the user can take a next action. As an example, if the user cooks, watching video content showing a cooking procedure, the user can wash and put away cookware after the last scene in which the cookware item appears. As another example, if the user watches drama or movie content for the purpose of watching a scene in which a particular person or item appears, the user can stop watching the content after the last scene in which the particular person or item appears. Thus, user convenience can be increased.

Furthermore, the user can be informed of all the objects which appear in video content immediately after start watching the video content, and prepare for an action to take while watching the video content. As an example, if the user cooks, watching video content showing a cooking procedure, all the cookware to be used are displayed, and thus the user can make the cookware ready for use. As another example, if the user watches drama or movie content for the purpose of watching a scene in which a particular person or item appears, the user can determine whether the particular person or item appears in the video content. Thus, user convenience can be increased.

Furthermore, the user can be aware during the playback of video content whether a certain object appears at least in or after a current scene. Thus, user convenience can be increased.

Furthermore, the user can be visually aware during the playback of video content whether a certain object appears at least in or after a current scene. Thus, user convenience can be increased.

It is stated in the present embodiment that object appearance information is displayed by showing an object name in text and changing the color of the name. However, each object may be represented by a uniquely identifiable icon, and the color and shape thereof may be changed, thereby presenting object appearance information. Furthermore, as metadata as illustrated in the object information 10003 in FIG. 3, data of such icons may be included in object information, or a link destination to an icon may be described in object information as metadata, and that data may be acquired. Furthermore, icon data and an object which are stored in the video playback device according to the present application may be associated with each other, thereby allowing stored icon data to be used.

As described above, the video playback device according to the present embodiment can inform a user visually and intuitively whether an object appears at least in or after a current scene, while playing video content. Thus, user convenience can be increased.

A description is given in the present embodiment, using an example in which object appearance information is displayed by showing an object name in text or representing an object by an icon; however, the video playback device may include the display unit 1008 having a touch panel, and have a function of displaying information relevant to an object (an image showing an object, for instance) by a user touching the text display portion of an object name or the icon portion. Furthermore, if a cooking video obtained by recording a cooking program is used as video content, an image of cookware, a list of ingredients, cooking processes, and others are conceivable as information relevant to an object to be displayed by touch operation.

As described above, according to the video playback device according to the present embodiment, a user can acquire information relevant to a presented object by simple operation. Thus, user convenience can be increased.

Furthermore, the user is visually aware of a presented object, and then can acquire information relevant to the object. Thus, user convenience can be increased.

It should be noted that in the present embodiment, the video playback device may have a function of automatically pausing the playback of video content when displaying object appearance information. Furthermore, the video playback device may have a function of automatically starting the playback after a certain time period elapses after the pause. In the case where the video playback device has the pause and automatic playback functions, if, for example, a cooking video obtained by recording a cooking program is used as video content, when cookware which will not be used in and after a current process is presented, a user can put away the cookware in the playback pause period.

As described above, according to the video playback device according to the present embodiment, a user can take a next action on an object for which the last appearance scene is over. As an example, if a user cooks, watching video content which shows a cooking procedure, playback is paused immediately after the last scene in which a certain cookware item appears. The user can wash and put away the cookware item during this time. Thus, user convenience can be increased.

[Variation of Embodiment 1]

In a variation of Embodiment 1, a description given of an example of a content playback device which presents whether an object which appears in content (a person or an item) appears in a scene after a scene being played. Here, a description is given of a data table necessary for processing, in more detail than Embodiment 1.

The following describes the variation of Embodiment 1, using drawings.

Figure 12:
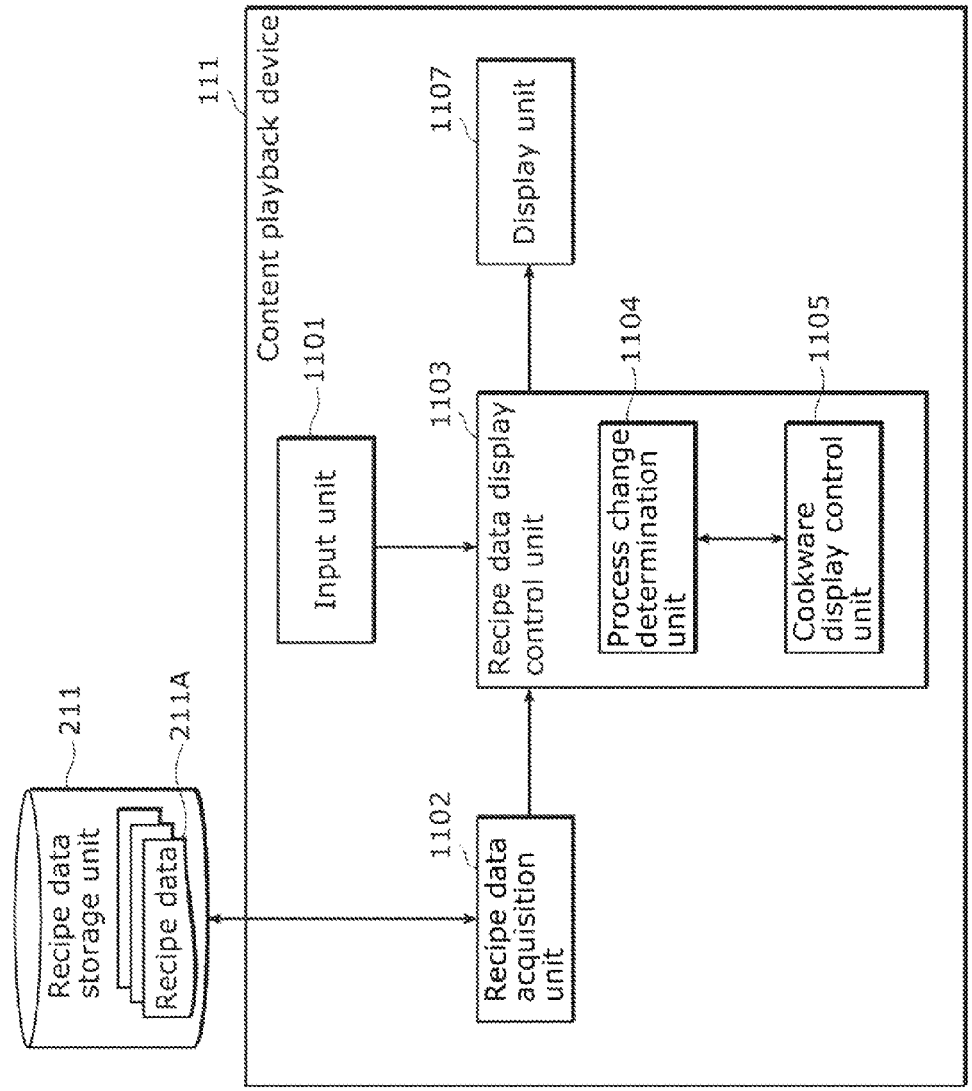
FIG. 12 is a block diagram illustrating functionality of a content playback device according to a variation of Embodiment 1.

FIG. 12 is a block diagram illustrating functions of a content playback device 111 according to this variation.

As illustrated in FIG. 12, the content playback device 111 includes an input unit 1101, a recipe data acquisition unit 1102, a recipe data display control unit 1103, and a display unit 1107. The recipe data display control unit 1103 includes a process change determination unit 1104 and a cookware display control unit 1105.

The input unit 1101 accepts cooking step transition operation by a user.

The recipe data acquisition unit 1102 acquires recipe data 211A stored in an external recipe data storage unit 211. The recipe data 211A includes, for each recipe, a cooking process associated with information indicating cookware used in the cooking process. The recipe data storage unit 211 is included in a server outside the content playback device 111. Further, the content playback device and the server are connected via a communication line. It should be noted that the content playback device 111 may include the recipe data storage unit 211. In that case, the recipe data storage unit 211 is connected to the recipe data acquisition unit 1102 via a signal line in the content playback device 111.

The recipe data display control unit 1103 detects a transition (change) of a process in content, and changes the display of cookware.

The process change determination unit 1104 detects a transition (change) of a process in content. Content shows cooking processes and is static content or dynamic content. Static content includes still images corresponding to the details of cooking processes and information indicating the order of the cooking processes. Here, the details of the cooking processes are stored as, for example, text information in the recipe data 211A. The "scene" in static content corresponds to one portion acquired when content is divided into a plurality of portions at separation of situations or settings. In particular, if each still image in static content is created in correspondence with separation of situations or settings, one still image in the static content may be associated with one scene. On the other hand, dynamic content shows a series of cooking processes by video. In other words, video content has videos corresponding to cooking processes and connected in the order in which the cooking processes advance.

If the process change determination unit 1104 detects a process change in content, the cookware display control unit 1105 changes the display of cookware which is not used in a current process and cookware which will not be used in and after the current process.

The display unit 1107 displays content and cookware. The display unit 1107 changes the display of cookware, based on the result determined by the recipe data display control unit 1103. It should be noted that "to play" also represents to display content (static content or dynamic content).

Figure 13:
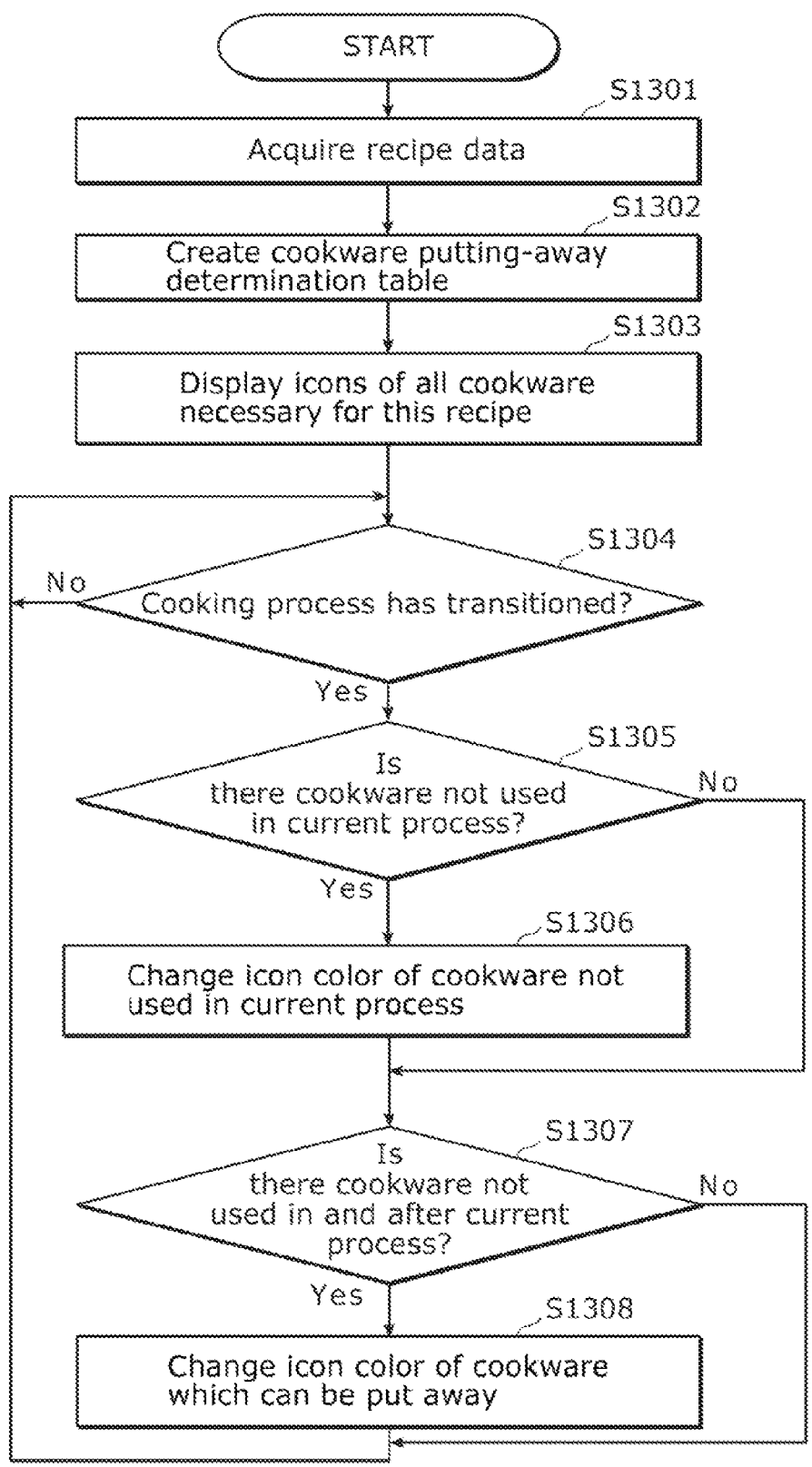
FIG. 13 is a flowchart of the content playback device according to the variation of Embodiment 1.

FIG. 13 is a flowchart of the content playback device 111 according to this variation.

In step S1301, the recipe data acquisition unit 1102 acquires recipe data 211A. FIG. 14A illustrates a specific example of the recipe data 211A (recipe data 1401). As illustrated in FIG. 14A, the recipe data 1401 at least includes a recipe ID, a dish name, and information on cooking processes. A recipe ID is an ID given in order to uniquely identify this recipe. A dish name is a name for this recipe and is a name of a dish made by cooking in accordance with this recipe. Cooking processes show a cooking method of this recipe on a process-by-process basis. It should be noted that the recipe data 1401 may further include information such as ingredients, a cooking time, calories, and amounts. Ingredients are food material necessary for this recipe. A cooking time is a time necessary for cooking in accordance with this recipe. Calories are contained in a dish made by cooking in accordance with this recipe.

Furthermore, a cooking process includes details of the cooking process and a cookware ID for the cooking process. FIG. 14B illustrates a specific example of cookware information (cookware information 1411). As illustrated in FIG. 14B, the cookware information 1411 includes a cookware ID, a cookware name, and information indicating an icon image of the cookware which are associated with one another. Information indicating an icon image is a filename of an electronic file storing the icon image, for example.

In step S1302, the recipe data display control unit 1103 creates a cookware putting-away determination table, using cooking processes included in the recipe data 211A and cookware information used in the cooking processes. A detailed description is later given of processing of creating the cookware putting-away determination table.

In step S1303, the recipe data display control unit 1103 displays icons of all the cookware necessary for the recipe on the display unit 1107.

In step S1304, the process change determination unit 1104 determines whether a cooking process has transitioned (changed). Here, if the process change determination unit 1104 determines that a cooking process has transitioned, processing of step S1305 is performed. On the other hand, the process change determination unit 1104 determines that a cooking process has not transitioned, processing of step S1304 is performed.

In step S1305, the recipe data display control unit 1103 determines whether there is cookware which is not used in a current cooking process. Here, if the recipe data display control unit 1103 determines that there is cookware which is not used in the current cooking process, processing of step S1306 is performed. On the other hand, if the recipe data display control unit 1103 determines that there is cookware which is not used in the current cooking process, processing in step S1307 is performed.

In step S1306, the cookware display control unit 1105 changes the icon color of the cookware which is not used in the current cooking process.

In step S1307, the recipe data display control unit 1103 determines whether there is cookware which is not used in and after the current cooking process. Here, if the recipe data display control unit 1103 determines that there is cookware which is not used, processing of step S1308 is performed. On the other hand, if the recipe data display control unit 1103 determines that there is no cookware which is not used, processing of step S1304 is performed.

In step S1308, the cookware display control unit 1105 changes the icon color of the cookware which is not used in and after the current cooking process. The user can be informed that the cookware which is not used in and after the cooking process may be put away. After the end of processing of step S1308, processing of step S1304 is performed.

Figure 15:
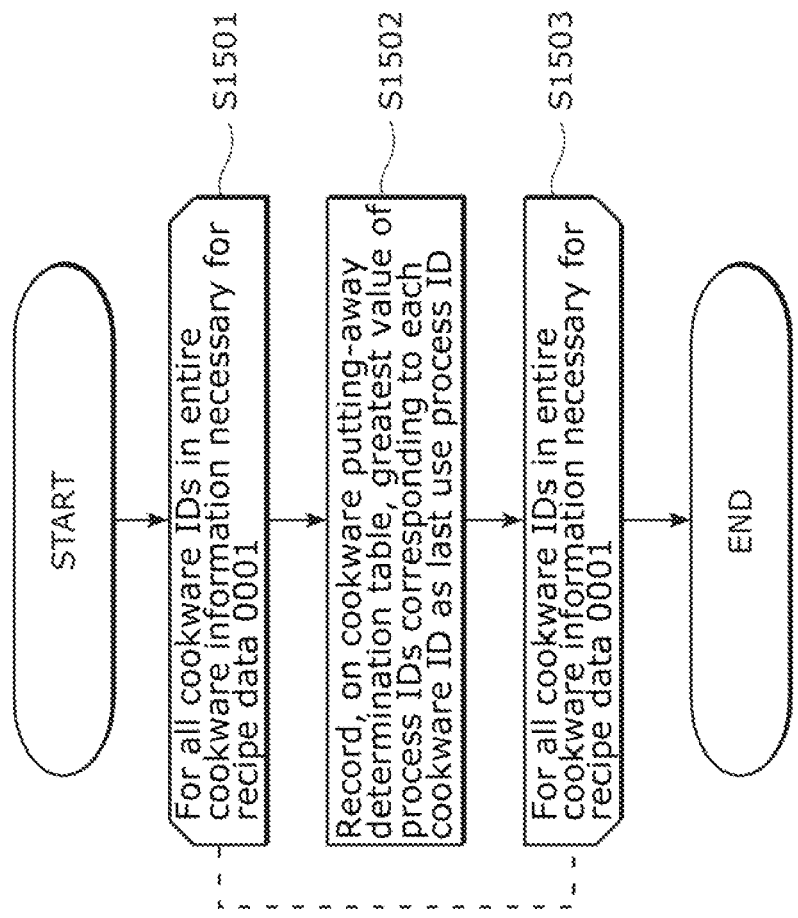
FIG. 15 is a flowchart illustrating processing of creating a cookware putting-away determination table.

FIG. 15 is a flowchart illustrating processing of creating a cookware putting-away determination table.

In the processing of creating a cookware putting-away determination table, processing (step S1502) between, step S1501 and step S1503 is performed for each of all the cookware necessary for the recipe data 1401.

In step S1502, the recipe data display control unit 1103 records, for each cookware ID, the greatest value of process IDs corresponding to the cookware ID as a last use process ID, on a cookware putting-away determination table 1611 (FIG. 168).

FIG. 16A illustrates cookware information 1601 indicating all the cookware necessary for the recipe data 1401. The cookware information 1601 is obtained by extracting cookware used for the recipe data 1401, from the cookware information 1411.

FIG. 168 illustrates a cookware putting-away determination table 1611. The cookware putting-away determination table 1611 is created in step S1502.

FIG. 16C illustrates a cookware use status table 1621 which includes a cooking process in association with the use status of cookware. The cookware use status table 1621 includes the results determined in both of steps S1305 and S1307.

Figure 17:
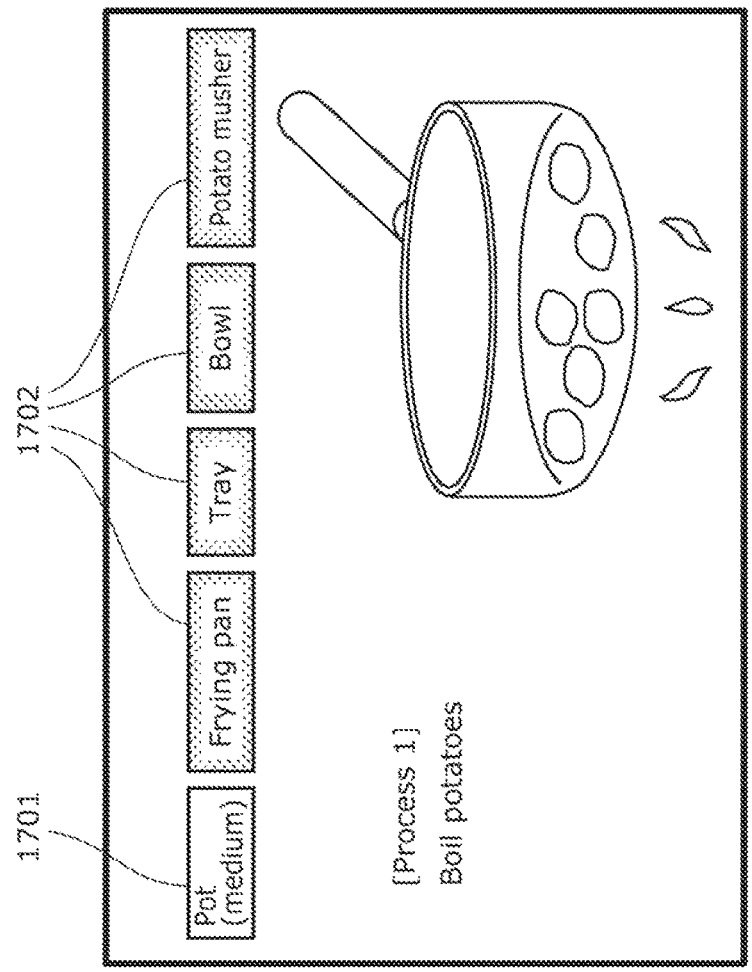
FIG. 17 illustrates a first example of screen display of the content playback device according to the variation of Embodiment 1.

FIG. 17 illustrates a first example of screen display of the content playback device 111 according to this variation.

In FIG. 17, cookware indicated by an icon 1701 is cookware used in a current cooking process. Here, the icon 1701 is shown as an icon having a white background. Cookware indicated by icons 1702 are not used in the current process, but will be used later. Here, the icons 1702 are shown as icons each having a dotted background.

Figure 18:
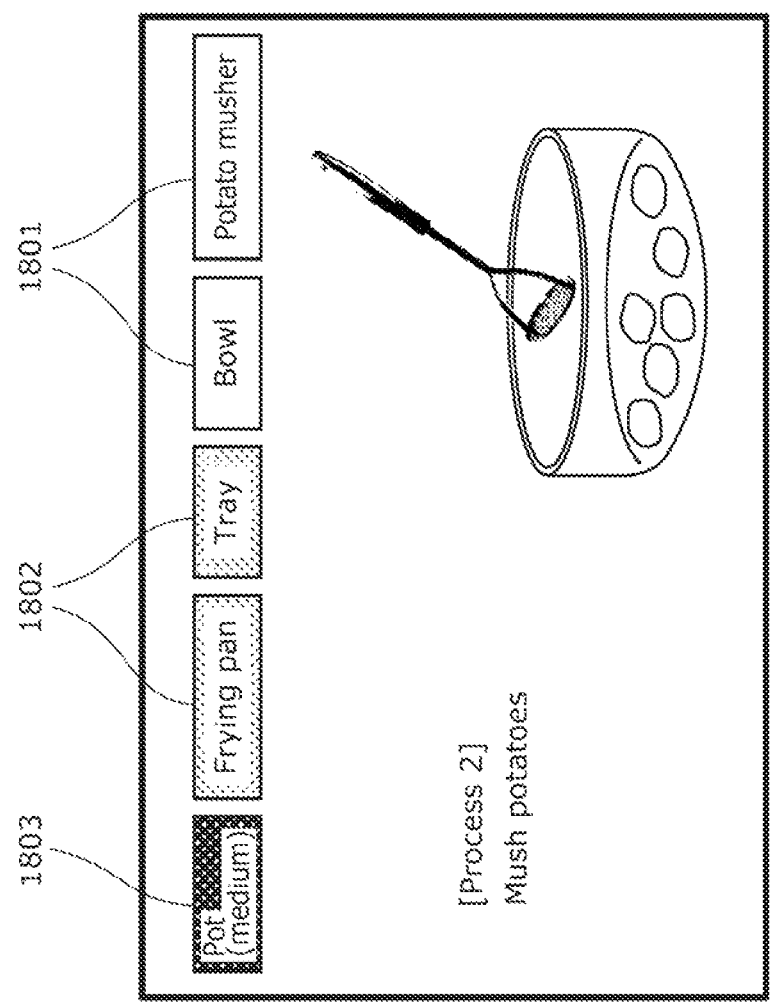
FIG. 18 illustrates a second example of screen display of the content playback device according to the variation of Embodiment 1.

FIG. 18 illustrates a second example of screen display of a content playback device 112 according to this variation.

In FIG. 18, the display modes of cookware indicated by icons 1801 and 1802 are the same as the display modes of the cookware indicated by the icons 1701 and 1702 in FIG. 17, respectively. Cookware indicated by an icon 1803 will not be used in and after a current process. Here, the icon 1803 is shown as an icon having a black background.

As illustrated in FIGS. 17 and 18, a user can be informed of use status of cookware by using different display modes of icons according to the use status of cookware.

[Embodiment 2]

In the present embodiment, a description is given of an example of presenting object appearance information to a user by displaying object appearance information in balloons.

Figure 19:
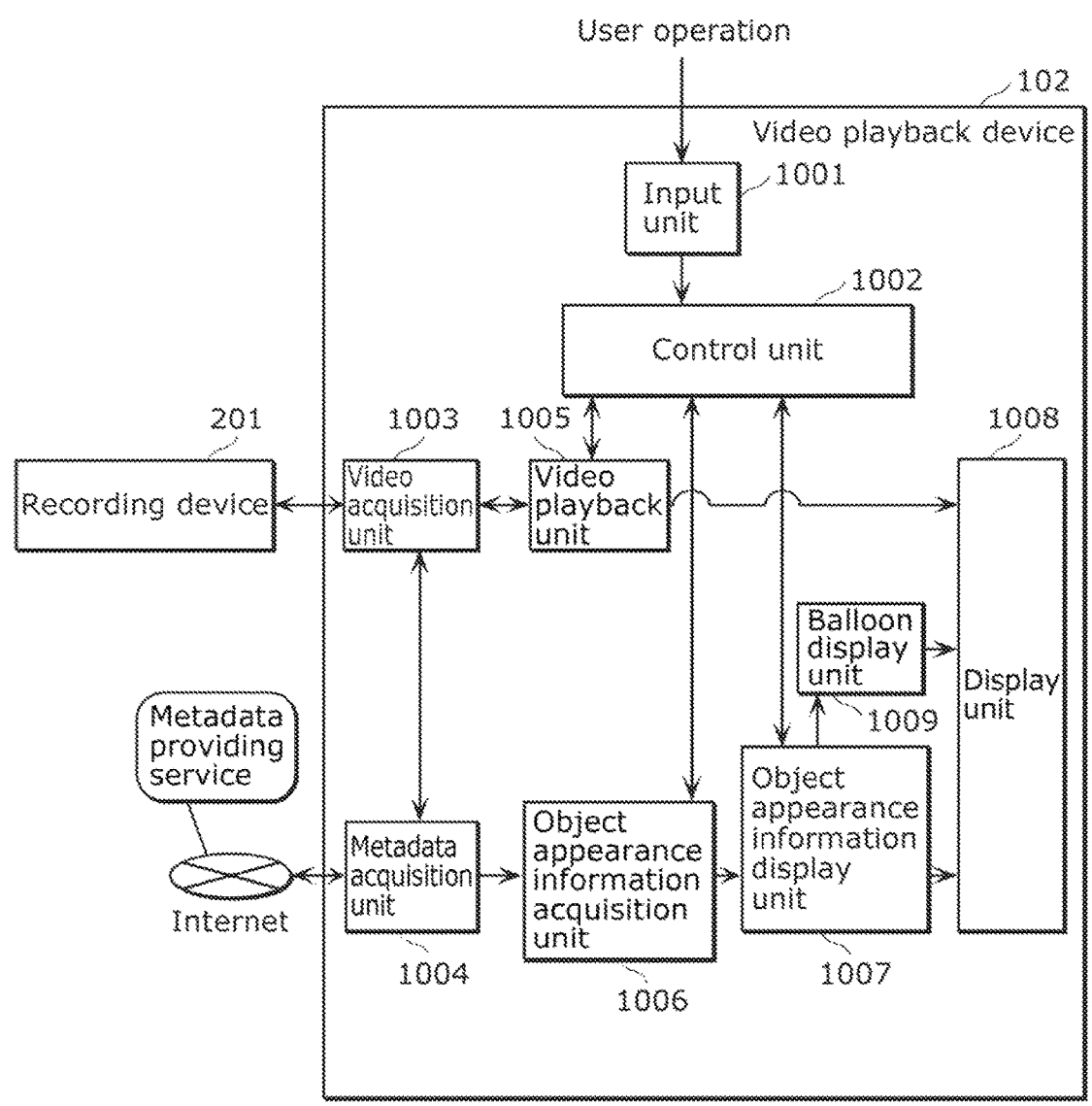
FIG. 19 is a block diagram illustrating a configuration of a video playback device according to Embodiment 2.

FIG. 19 is a block diagram illustrating a configuration of a video playback device 102 according to the present embodiment. A description of blocks having equivalent functions to those in FIG. 1 among the blocks illustrated in FIG. 19 is omitted. It should be noted that the video playback device 102 corresponds to a content playback device.

The video playback device 102 includes a balloon display unit 1009, in addition to the functional blocks included in the video playback device 101 according to Embodiment 1.

The recording device 201 can receive a digital broadcast, record program data which includes the received video content, and output the recorded program data.

The input unit 1001 accepts user operation. Examples of user operation include key operation on the video playback device, and the like. In addition, user operation may be remote control operation if the video playback device 102 has an infrared ray receiving unit. User operation may be touch operation if the video playback device 102 has a touch panel. User operation may be gesture operation if the video playback device 102 has a distance sensor. The input unit 1001 notifies the control unit 1002 of information on video content designated by the accepted operation as an instruction.

Upon receipt of the instruction from the input unit 1001, the control unit 1002 notifies the video playback unit 1005 of a playback start request for video content included in the instruction.

Upon receipt of the playback start request for the video content from the control unit 1002, the video playback unit 1005 notifies the video acquisition unit 1003 of an acquisition start request for the designated video content.

Upon receipt of the acquisition start request for the video content from the video playback unit 1005, the video acquisition unit 1003 acquires the designated video content from the recording device 201, and furthermore notifies the metadata acquisition unit 1004 of a metadata acquisition start request for metadata of the designated video content.

When the video acquisition unit 1003 completes acquiring the video content, the video acquisition unit 1003 notifies the video playback unit 1005 of a content acquisition completion notification, and furthermore transmits the video content data to the video playback unit 1005. Upon receipt of the content acquisition completion notification, the video playback unit 1005 notifies the control unit 1002 of that content acquisition completion notification.

Upon receipt of the metadata acquisition start request from the video acquisition unit 1003, the metadata acquisition unit 1004 accesses a metadata providing service or the like via the Internet, and acquires metadata corresponding to the designated video content. It should be noted that the metadata acquisition unit may include a storage device, and store therein acquired metadata. In that case, if metadata to be acquired is already stored in the metadata acquisition unit 1004, the metadata acquisition unit 1004 performs subsequent processing using the stored metadata, without accessing metadata providing service.

Next, the metadata acquisition unit 1004 notifies the video acquisition unit 1003 of scene information (the start and end times of each scene) described in the acquired metadata. Upon being notified of the scene information, the video acquisition unit 1003 notifies the video playback unit 1005 of the scene information.

The metadata acquisition unit 1004 outputs the acquired metadata to the object appearance information acquisition unit 1006.

The object appearance information acquisition unit 1006 acquires, for each scene of the video content, by analyzing metadata, object appearance information of each object appearing in the scene, which indicates whether the object appears at least in or after the scene.

Based on the information described in the metadata, the object appearance information acquisition unit 1006 acquires, for each scene of the video content, object appearance information of an object appearing in the scene being played, an object which does not appear in a scene being played, but will appear after the scene being played, and an object which does not appear in and after the scene being played.

Upon completion of acquiring object appearance information, the object appearance information acquisition unit 1006 transmits the object appearance information and the metadata to the object appearance information display unit 1007, and furthermore notifies the control unit 1002 of an acquisition completion notification.

Upon receipt of both the content acquisition completion notification from the video playback unit 1005 and the acquisition completion notification from the object appearance information acquisition unit 1006, the control unit 1002 notifies again the video playback unit 1005 of the playback start request for the video content, and furthermore notifies the object appearance information display unit 1007 of an object appearance information presentation start request.

Upon receipt of the playback start request for the video content, the video playback unit 1005 starts playing the video content, and outputs video content display data which includes a video to be played to the display unit 1008.

Upon receipt of a display start request for the object appearance information, the object appearance information display unit 1007 outputs object appearance information display data to the display unit 1008.

Furthermore, the object appearance information display unit 1007 outputs a character string indicating the object appearance information to the balloon display unit 1009. Upon receipt of the character string indicating the object appearance information from the object appearance information display unit 1007, the balloon display unit 1009 processes the character string indicating the object appearance information into balloon display data, and outputs the balloon display data to the display unit 1008.

The display unit 1008 superimposes the balloon display data received from the balloon display unit 1009 and the object appearance information display data received from the object appearance information display unit 1007 on the video content display data received from the video playback unit 1005, and displays the resultant data.

When the video playback unit 1005 is playing video content, the control unit 1002 manages elapsed time from the playback start time of the video content, and successively notifies the video playback unit 1005 and the object appearance information display unit 1007 of information on elapsed time from the playback start time.

When the time has come to when a scene of the played video content transitions, the video playback unit 1005 notifies the object appearance information display unit 1007 of an object appearance information update request.

Here, "a time when a scene transitions" means a playback start time or an end time of a scene currently played and a start time of the next scene.

Upon receipt of the object appearance information update request, the object appearance information display unit 1007 outputs information on object appearance information to the display unit 1008. Further, the object appearance information display unit 1007 outputs a character string indicating object appearance information to the balloon display unit 1009. The balloon display unit 1009 processes, into balloon display data, the character string for informing the object appearance information, and outputs balloon display data to the display unit 1008.

The display unit 1008 updates the display, thereby displaying the newest object appearance information and the balloon display superimposed on video content.

The video playback unit 1005 ends the playback of the video content which has been played when the video playback unit 1005 finishes the playback at the end (when the end time of the video content comes), and furthermore transmits a playback end notification to the control unit 1002, thereby notifying the end of the playback. Upon receipt of the playback end notification, the control unit 1002 notifies the object appearance information display unit 1007 thereof. Upon receipt of the playback end notification, the object appearance information display unit 1007 notifies the display unit 1008 of a display erase request.

According to such a configuration, based on metadata acquired by the metadata acquisition unit 1004, the object appearance information acquisition unit 1006 determines, for each scene of video content being played, which of the following three types corresponds to each object, namely, object appearance information of an object which appears in the scene, object appearance information of an object which does not appear in the scene, but appears in a scene after the scene, and object appearance information of an object which does not appear in a scene after the scene. The display unit 1008 superimposes object appearance information display output by the object appearance information display unit 1007 and balloon display of a character string for informing object appearance information output by the balloon display unit 1009 on video content played by the video playback unit 1005.

It should be noted that although there are three types of object appearance information in the present embodiment, the types of object appearance information may be two, namely, appearance information for an object which appears at least in or after a current scene and appearance information for an object which does not appear in and after the current scene.

Consequently, for example, when playing video content of a cooking program, it is possible to present to a user, in each cooking process, cookware not used in and after the currently played cooking process, and the like, with emphasis. Thus, when cooking, watching video content, when to put away cookware can be shown to a user with much clarity.

Although it is stated in the present embodiment that the recording device 201 receives a digital broadcast, content data outputted from, for instance, an external content transmission device such as a video content server may be inputted, rather than a broadcast is input.

Although it stated that the recording device 201 can receive a digital broadcast, record the received program, and output the recorded video content, an Internet network or a video content server present in a home may be used, for example. Furthermore, a device which can record and output video content can be substituted for the recording device 201 described in the present embodiment.

Although an example is used in which the recording device 201 is connected to the outside, the video playback device 101 may have a function equivalent to that of the recording device.

Although it is stated that the metadata acquisition unit 1004 accesses, for instance, a metadata providing service via the Internet, and acquires metadata corresponding to a designated video content, the metadata acquisition unit 1004 may acquire metadata from another server. For example, data including SI data in digital broadcasting waves received by the recording device 201 may be acquired as metadata. Metadata is previously stored in, for instance, a video content server mentioned above as data together with video content, and that data may be acquired as metadata.

Although it is stated that the control unit 1002 has a timer function, manages elapsed time from a playback start time, and successively notifies the video playback unit 1005 and the object appearance information display unit 1007 of information on elapsed time from the playback start time, time stamp information included in video content may be used as the elapsed time information.

The flow of control regarding object appearance information detection by the video playback device according to the present embodiment is completely the same as object appearance information detection by the video playback device according to Embodiment 1 illustrated in FIG. 6.

The flow of control regarding object appearance information display by the video playback device according to the present embodiment can be achieved by immediately before processing of step S3014 in FIG. 7, the balloon display unit 1009 processing a character string for informing object appearance information into balloon display data, and outputting the data to the display unit 1008, and the display unit 1008 adding processing for superimposing the balloon display. Other processing is completely the same as object appearance information display by the video playback device according to Embodiment 1 illustrated in FIG. 7.

Figure 20:
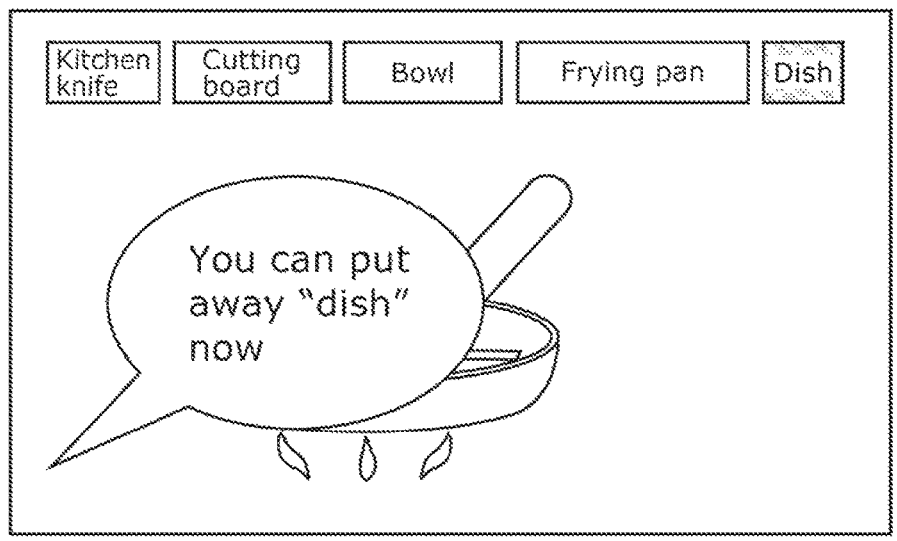
FIG. 20 illustrates an example of application to a recipe video (balloon display) in Embodiment 2.
Figure 21:
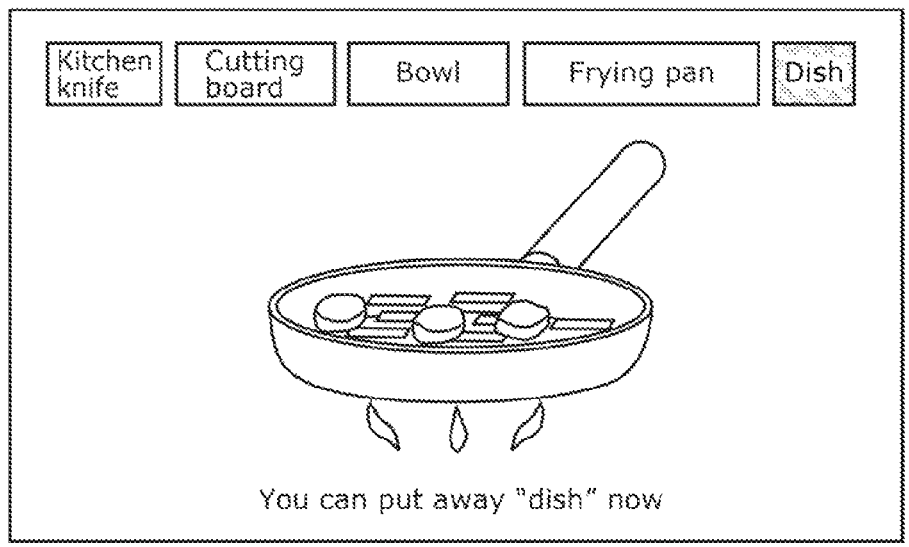
FIG. 21 illustrates an example of application to a recipe video (subtitle display) in Embodiment 2.
Figure 22:
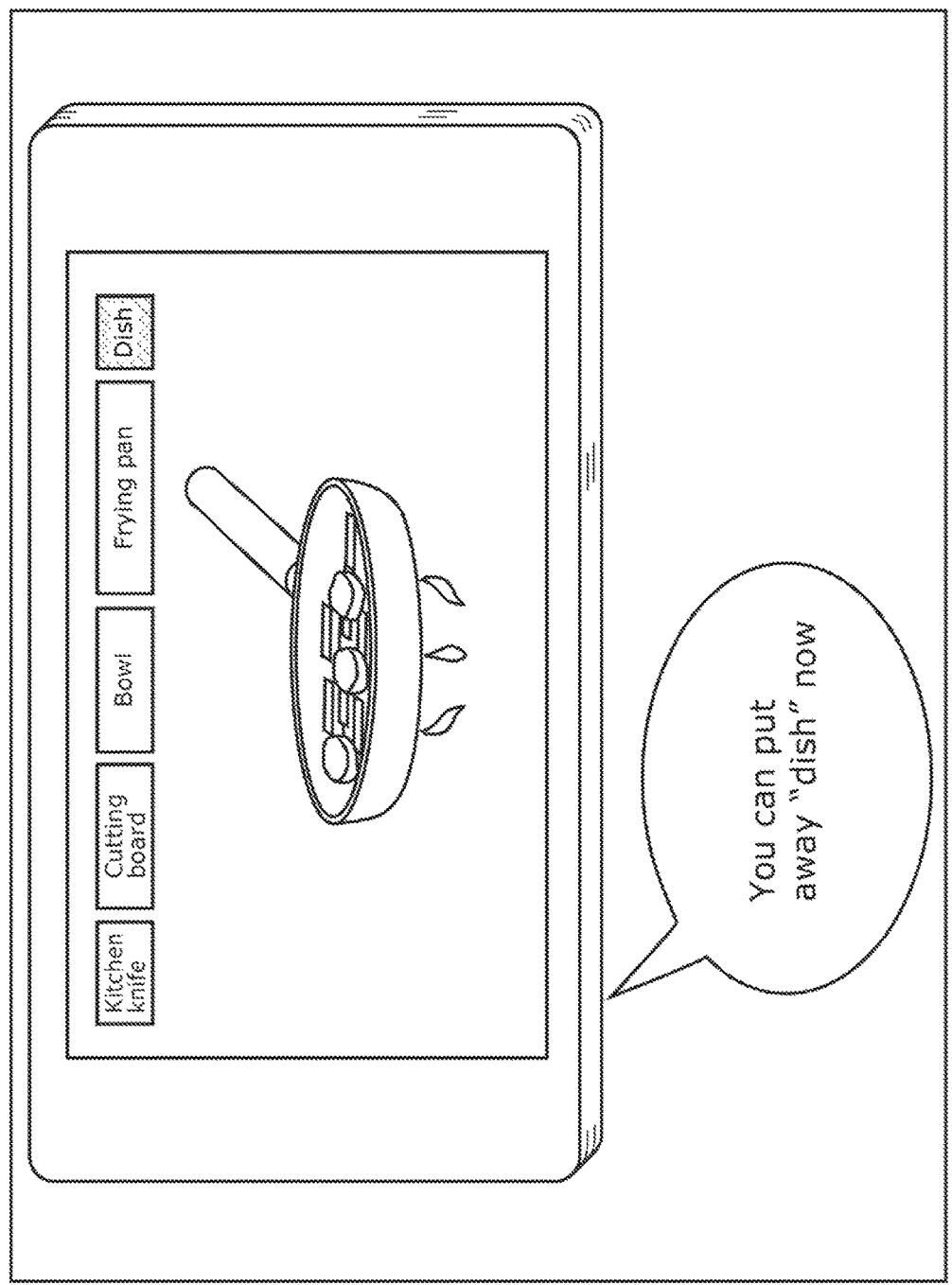
FIG. 22 illustrates an example of application to a recipe video (sound output) in Embodiment 2.

FIGS. 20, 21, and 22 illustrate examples of application to a recipe video according to the present embodiment.

FIG. 20 illustrates an example of application (balloon display) to a recipe video according to the present embodiment. As illustrated in FIG. 20, according to the present embodiment, a message showing that a user may put away cookware which is not used in and after a current scene is shown in a balloon format.

FIG. 21 illustrates an example of application (subtitle display) to a recipe video according to the present embodiment. As shown in FIG. 21, a message showing that a user may put away cookware which is not used in and after a current scene is shown in a subtitle display format, according to the present embodiment.

FIG. 22 illustrates an example of application (voice output) to a recipe video according to the present embodiment. As shown in FIG. 22, a message showing that a user may put away the cookware which is not used in and after a current scene is outputted as a sound, according to the present embodiment.

The output of a message as shown in FIGS. 20, 21, and 22 can inform the user that cookware which is not used in and after the current scene may be put away.

As described above, according to the video playback device according to the present embodiment, the user can be easily aware of whether an object appears at least in or after a scene by a balloon displayed simultaneously with video content during the playback of the video content. Therefore, user convenience can be increased.

It should be noted that in the present embodiment, an example is described in which the balloon display unit is provided, and a character string for informing object appearance information is displayed in a balloon, thereby presenting object appearance information to a user with emphasis. Instead of displaying a character string in a balloon, a method of notifying the user of object appearance information by sound may be used. This achieves the same effects as the present embodiment in each cooking process for a dish when video content of a cooking program is played, for example.

As described above, according to the video playback device according to the present embodiment, a user can be aware of, during the playback of video content, whether a certain object appears at least in or after a current scene by hearing it as a sound. Thus, user convenience can be increased.

[Variation 1 of Embodiment 2]

In this variation, a description is given of a first example in which in the content playback device according to the variation of Embodiment 1, object appearance information is further displayed in a balloon, thereby presenting object appearance information to a user. Here, a specific example of object appearance information indicates that a certain object does not appear in and after a scene being played.

Figure 23:
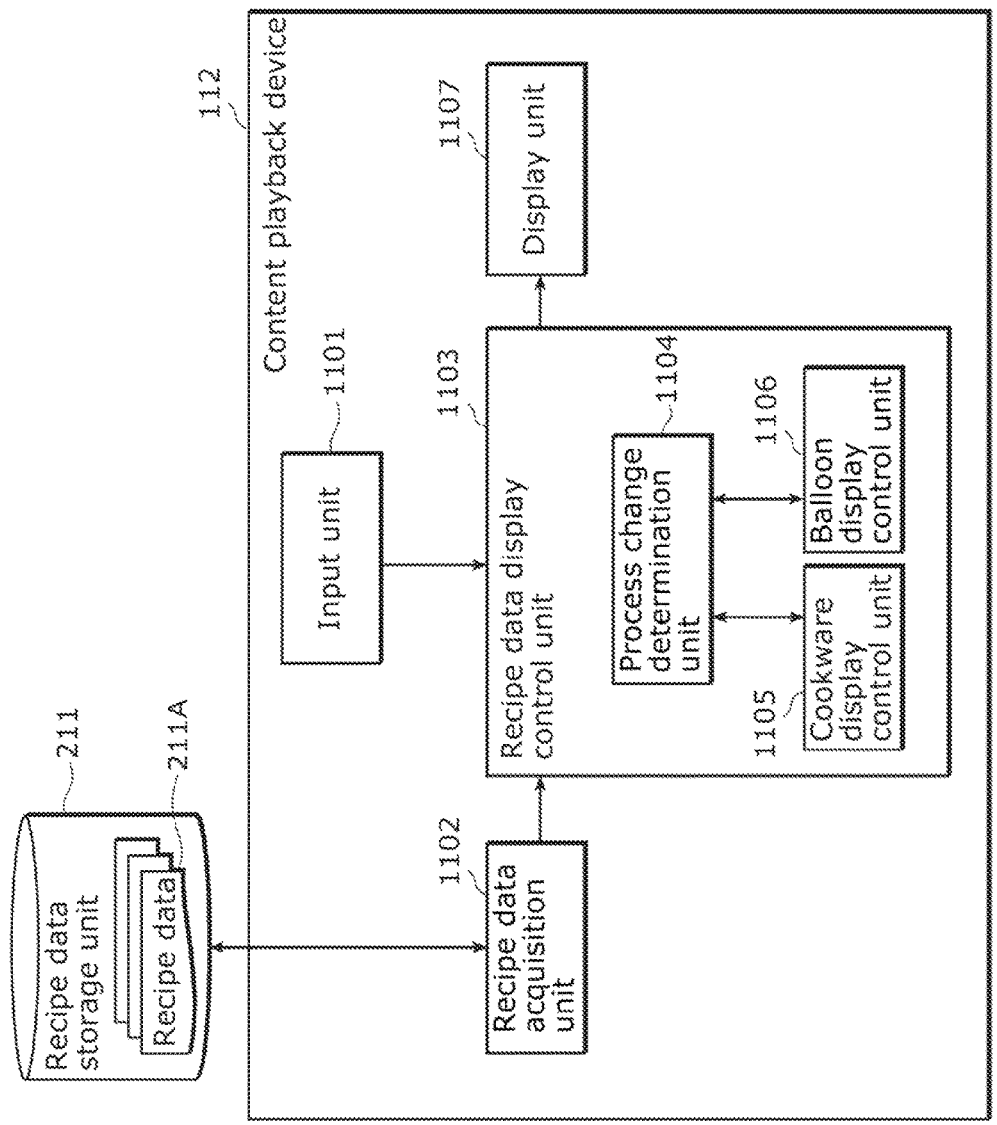
FIG. 23 is a block diagram illustrating functionality of a content playback device according to Variation 1 of Embodiment 2.

FIG. 23 is a block diagram illustrating functions of content playback device 112 according to this variation.

As illustrated in FIG. 23, the content playback device 111 includes the input unit 1101, the recipe data acquisition unit 1102, the recipe data display control unit 1103, and the display unit 1107. Further, the recipe data display control unit 1103 includes the process change determination unit 1104, the cookware display control unit 1105, and a balloon display control unit 1106. The configuration of this variation includes the balloon display control unit 1106 added to the variation of Embodiment 1.

Based on the result determined by the recipe data display control unit 1103, the balloon display control unit 1106 displays use status of cookware in a balloon display format.

Figure 24:
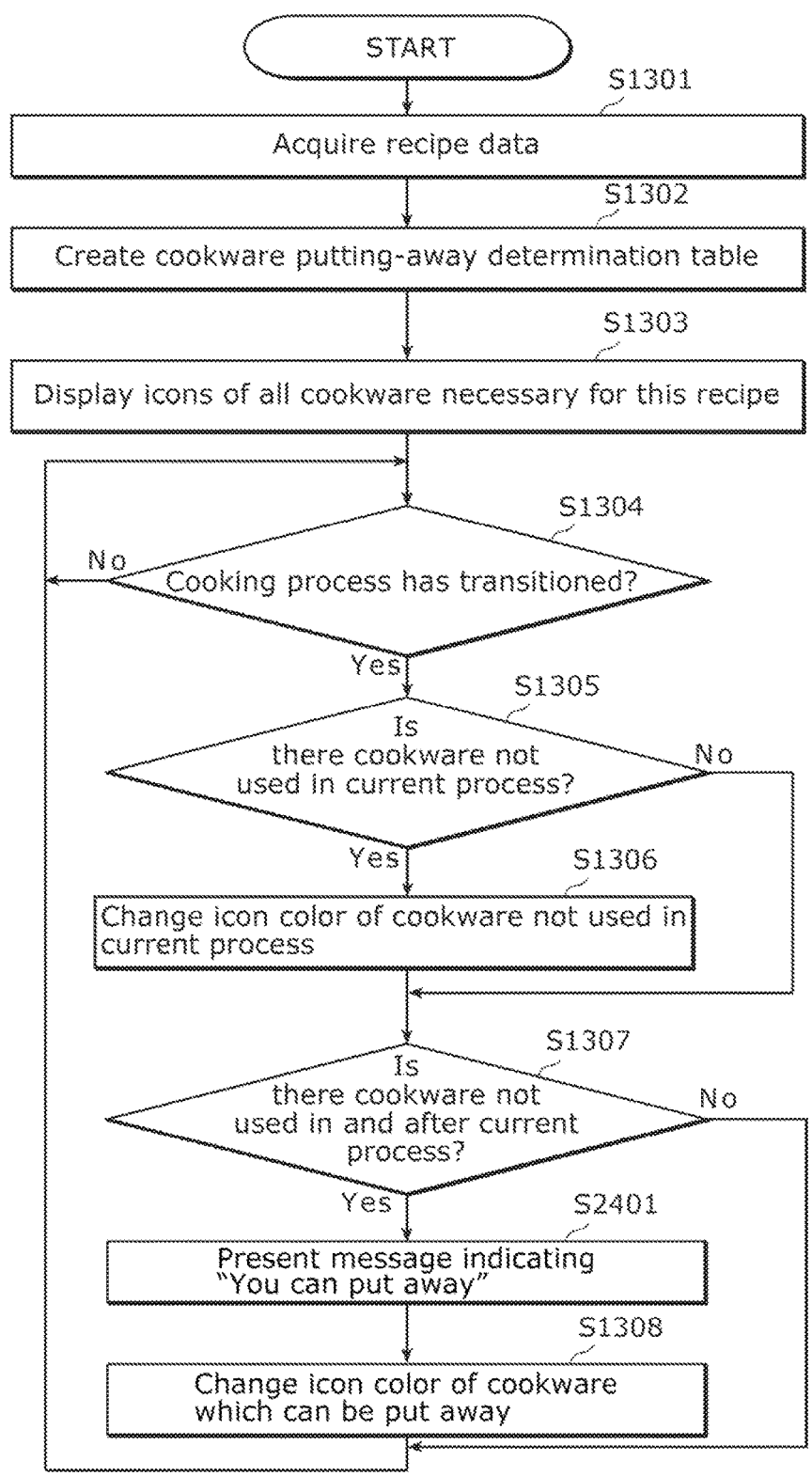
FIG. 24 is a flowchart of the content playback device according to Variation 1 of Embodiment 2.

FIG. 24 is a flowchart of the content playback device 112 according to this variation. In FIG. 24, a difference from FIG. 13 is step S2401.

In step S2401, the balloon display control unit 1106 presents a message indicating "You can put away" cookware which is not used in and after a current process, at a position corresponding to the position on the display unit 1107 at which the cookware is displayed.

Figure 25:
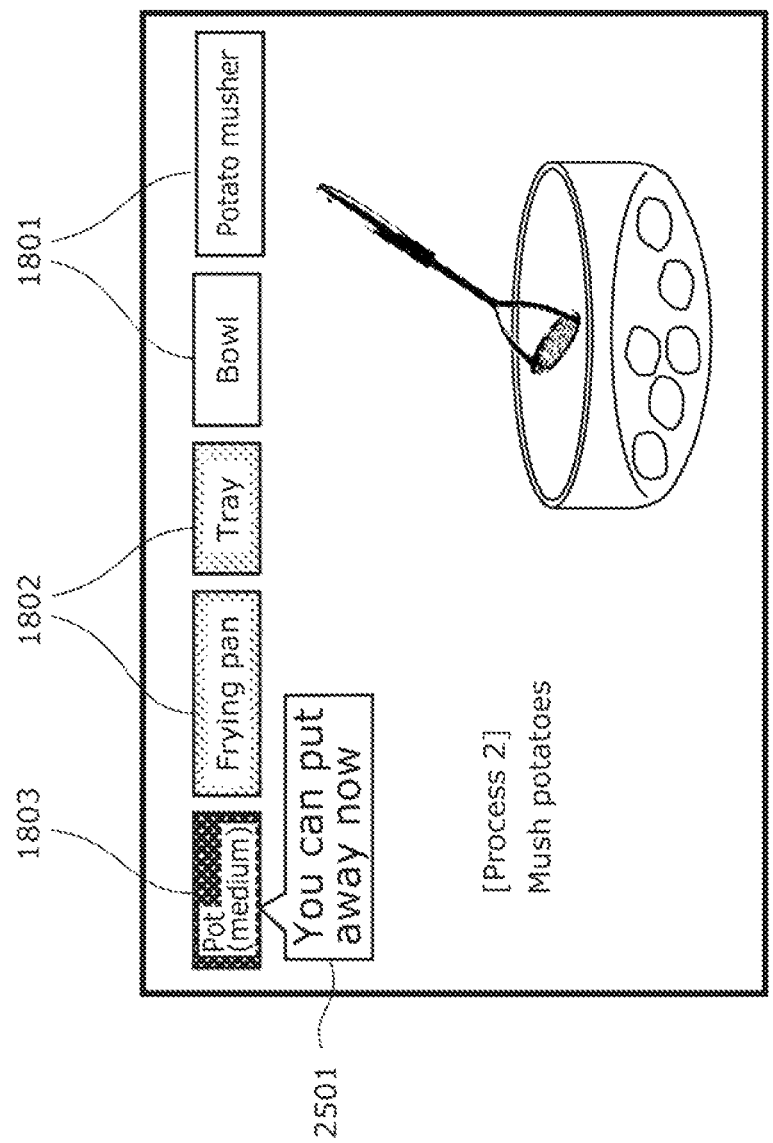
FIG. 25 illustrates an example of screen display of the content playback device according to Variation 1 of Embodiment 2.

FIG. 25 illustrates a first example of display of a message by the balloon display control unit 1106.

As illustrated in FIG. 25, at a position corresponding to an icon 1803 showing the cookware which is not used in and after the cooking process, a message 2501 (a first message) indicating that "You can put away" is displayed. By displaying such a message, the use status of cookware can be informed of a user with much clarity.

[Variation 2 of Embodiment 2]

In this variation, a description is given of a second example in which in the content playback device according to the variation of Embodiment 1, object appearance information is further displayed in a balloon, thereby presenting the object appearance information to a user. Here, a specific example of object appearance information is that a certain object appears in a scene following a scene being played.

Figure 26:
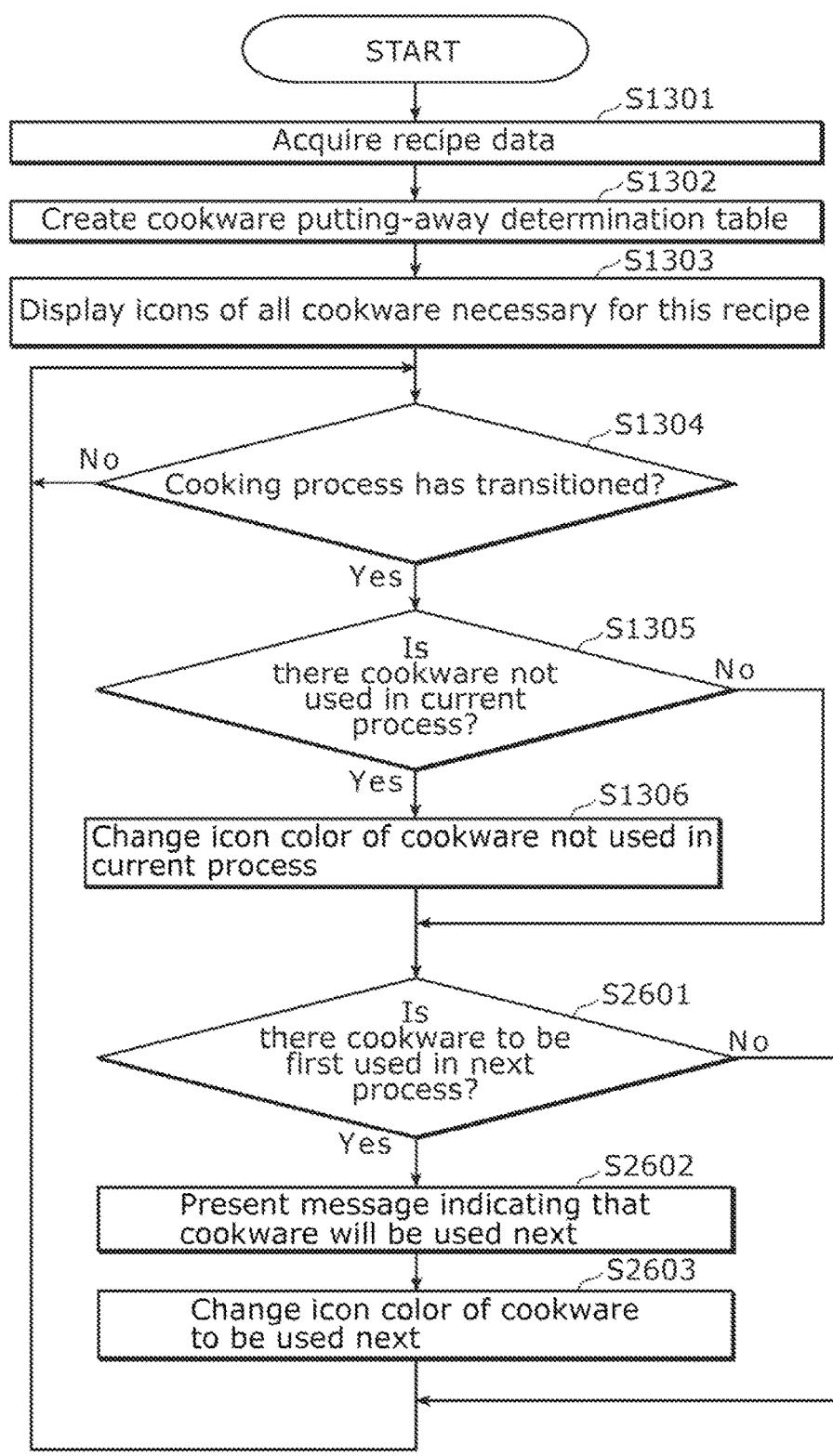
FIG. 26 is a flowchart of a content playback device according to Variation 2 of Embodiment 2.

FIG. 26 is a flowchart of the content playback device according to this variation. In FIG. 26, differences from FIG. 24 are steps S2601, S2602, and S2603.

In step S2601 the recipe data display control unit 1103 determines whether there is any cookware to be first used in a cooking process following a current cooking process. Here, if the recipe data display control unit 1103 determines that there is cookware to be first used, processing of step S2602 is performed. On the other hand, if the recipe data display control unit 1103 determines that there is no cookware to be first used, processing of step S1304 is performed.

In step S2602, at a position corresponding to the position on the display unit 1107 at which cookware to be first used in a process following the current cooking process is displayed, the balloon display control unit 1106 presents a message indicating that the cookware will be used next.

In step S2603, the cookware display control unit 1105 changes the icon color of the cookware to be first used in the cooking process following the current cooking process. The user can notice that it is better to make the cookware ready for use in the cooking process following the current cooking process. After ending processing of step S2603, processing of step S1304 is performed.

FIG. 27 illustrates a second example of message display by the balloon display control unit 1106.

As illustrated in FIG. 27, a message 2702 (second message) indicating that the cookware will be used next is displayed at a position corresponding to an icon 2701 indicating cookware to be first used in the cooking process following the current cooking process. The display of such a message can inform the user of the use status of cookware with much clarity.

Descriptions of the above embodiments and the variations thereof are given of the content playback device which shows a user a cooking procedure. This content playback device is applicable not only to content showing a cooking procedure to a user, but also to other content.

FIG. 28 illustrates an example of screen display of a content playback device which plays a drama as content. As illustrated in FIG. 28, the content playback device shows a video of a drama on the screen. At the upper portion of the screen, icons corresponding to plural characters (here, names of the characters) are displayed in display modes corresponding to appearance information of the characters. Specifically, the content playback device displays icons 2801 having a white background for characters appearing in a current scene, namely, James, Robert, David, Mary, and Linda.

Further, the content playback device shows, as an icon having a dotted background, an icon 2802 for character Margaret who will appear in a later scene although she does not appear in the current scene.

Further, the content playback device shows an icon 2803 for character Thomas who will not appear in and after the current scene as an icon having a black background.

Furthermore, the content playback device according to each embodiment can also play live broadcast content. Information determined before broadcast can be used for object information of the live broadcast content. Further, for object information, information created so as to follow a live broadcast may be successively received and utilized. Furthermore, both of the above information may be combined and used. Specifically, information determined before broadcasting may be used at a point in time when the broadcast starts, and information created so as to follow the live broadcast may be received successively after the start of broadcasting. Then, both the information determined before broadcasting and the received information, or information obtained by changing the information determined before broadcasting using the received information may be used.

[Other Variations]

It should be noted that although the present invention has been described based on the above embodiments, it is needless to say that the present invention is not limited to the above embodiments. The cases as below are also included in the present invention.

(1) Specifically, each device described above may be achieved by a computer system which includes a microprocessor, a ROM, a RAM, a hard disk unit, a display unit, a keyboard, a mouse, and the like. A computer program is stored in the RAM or the hard disk unit. The operation of the microprocessor in accordance with the computer program allows each device to achieve its functionality. Here, the computer program includes a combination of instruction codes indicating instructions to a computer in order to achieve given functionality.

(2) Some or all of constituent elements included in each device described above may include a single system large scale integration (LSI: large scale integrated circuit). The system LSI is a super multi-function LSI manufactured by integrating plural components in one chip, and is specifically a computer system configured so as to include a microprocessor, a ROM, a RAM, and so on. A computer program is stored in the RAM. The system LSI accomplishes its functions through the load of the computer program from the ROM to the RAM by the microprocessor and the operation of the microprocessor in accordance with the computer program.

(3) Some or all of constituent elements included in each device described above may include an IC card or a single module which can be attached to or detached from the device. The IC card or the module is a computer system which includes a microprocessor, a ROM, a RAM, and the like. The above super-multifunctional LSI may be included in the IC card or the module. The IC card or the module accomplishes its functions through the operation of the microprocessor in accordance with the computer program. This IC card or module may have tamper resistant properties.

(4) The present invention may be achieved by the methods described above. In addition, these methods may be achieved by a computer program implemented by a computer, or may be implemented by a digital signal which includes a computer program.

The present invention may be achieved by a computer program dr a digital signal stored in a computer-readable recording medium such as, for example, a flexible disk, a hard disk, CD-ROM, MO, DVD, DVD-ROM, DVD-RAM, a blue-ray disc (BD), or a semiconductor memory. Alternatively, the present invention may be achieved by a digital signal stored in such a recording medium.

According to the present invention, the computer program or the digital signal may be transmitted via, for instance, data broadcasting or a network typified by electric telecommunication lines, wireless or wired communication lines, and the Internet.

The present invention may be a computer system which includes a microprocessor and a memory, the memory may have stored therein a computer program, and the microprocessor may operate in accordance with the computer program.

Another independent computer system may implement a program or a digital signal which has been stored in a recording medium and transported thereto or a program or a digital signal transported via a network or the like.

(5) The above embodiments and the above variations may be combined.

It should be noted that the functional blocks illustrated in the drawings are typically implemented into a Large Scale Integration (LSI) which is an integrated circuit. These functional blocks may be each formed as a single chip or may be formed as a single chip to include some or all of the blocks (for example, functional blocks except for a memory may be formed as a single chip).

Although an LSI is mentioned here, the integrated circuit may also be called an integrated circuit (IC), a system LSI, a super LSI, or an ultra LSI, depending on the difference in the degree of integration.

Moreover, ways to achieve integration are not limited to the LSI, and a dedicated circuit or a general purpose processor can also achieve the integration. A field programmable gate array (FPGA) that allows programming or a reconfigurable processor that allows reconfiguration of the connections and settings of the circuit cells inside the LSI may also be used.

In addition, depending on the emergence of circuit integration technology that replaces LSIs due to the progress of semiconductor technology or other derivative technology, such technology may be of course used to integrate the functional blocks. Application of biotechnology is one such possibility.

Furthermore, from among the functional blocks, a separate configuration may be adopted for a unit which stores data to be coded or decoded, rather than the unit is configured as a single chip.

It should be noted that in the above embodiments, each of the constituent elements may be constituted by dedicated hardware, or may be achieved by executing a software program suitable for the constituent element. Each constituent element may be achieved by a program execution unit such as a CPU or a processor reading and executing a software program stored in a recording medium such as a hard disk or semiconductor memory. Here, software which achieves the content reproduction device according to the above embodiments and others is a program as described below.

Specifically, this program causes a computer to execute: playing content having plural scenes; acquiring, for each of the plural scenes, object appearance information of each of one or more objects which appear in the content by analyzing metadata which includes appearance scene data for identifying the one or more objects appearing in at least one of the scenes, the object appearance information indicating whether the object appears after the scene; and presenting the object appearance information acquired for a scene being played, when the playback unit is playing the content.

Although the above is a description of the content playback device according to one or more aspects, based on the embodiments, the present invention is not limited to the embodiments. Various modifications to the embodiments that may be conceived by those skilled in the art and combinations of constituent elements in different embodiments may be included within the scope of the one or more aspects, without departing from the spirit of the present invention.

According to the present invention, the content playback device which plays content can visually present to a user, for each scene of the content, appearance information of an object which appears in at least one of the scenes. Accordingly, in the case of content which shows a cooking procedure, it is possible to present during cooking when to put away cookware. Further, in the case of drama or movie content, a user can select a scene in which a particular actor or sport player appears, and watch the content efficiently.

REFERENCE SIGNS LIST

101, 102 Video playback device
111, 112 Content playback device
201 Recording device
211 Recipe data storage unit
211A, 1401 Recipe data
1001, 1101 Input unit
1002 Control unit
1003 Video acquisition unit
1004 Metadata acquisition unit
1005 Video playback Unit
1006 Object appearance information acquisition unit
1007 Object appearance information display unit
1008, 1107 Display unit
1009 Balloon display unit
1102 Recipe data acquisition unit
1103 Recipe data display control unit
1104 Process change determination unit
1105 Cookware display control unit
1106 Balloon display control unit
1411, 1601 Cookware information
1611 Cookware putting-away determination table 1621 Cookware use status table
1701, 1702, 1801, 1802, 1803, 2701, 2801, 2802, 2803 Icon
2501, 2702 Message
10001 Metadata
10002 Scene information
10003 Object information
10004 Ingredient information
20001 Appearance object count
20002 Appearance object table

The invention claimed is:

1. A content playback device comprising:
a non-transitory memory storing a program; and
a hardware processor configured to execute the program so that the content playback device operates as:
a playback unit configured to play content having plural scenes;
an object appearance information acquisition unit configured to acquire, for each of the plural scenes, object appearance information of each of one or more objects which appear in the content by analyzing metadata which describes the one or more objects appearing in at least one of the scenes, the object appearance information indicating, for each of the objects, that the object: 1) appears in a current scene being displayed, 2) does not appear in the current scene being displayed, but appears in a next scene after the current scene, and 3) does not appear in the current scene being displayed, but appears in a scene after the next scene; and
a presentation unit configured to present the object appearance information acquired on the current scene being played indicating, for each of the objects, that the object: 1) appears in the current scene being displayed, 2) does not appear in the current scene being displayed, but appears in a next scene after the current scene, and 3) does not appear in the current scene being displayed, but appears in a scene after the next scene, when the playback unit is playing the content, the object appearance information being superimposed on the content of the current scene being played.

2. The content playback device according to claim 1, wherein the playback unit is configured to play the content having the plural scenes which show details of cooking in plural cooking processes for a dish, and
the object appearance information acquisition unit is configured to acquire, for each of the plural scenes, the object appearance information of each of the one or more objects which are cookware used for cooking in at least one of the plural cooking processes.

3. The content playback device according to claim 1, further comprising
a storage unit configured to store as the content, for each of the plural cooking processes, cooking process information indicating details of the cooking process and cookware information indicating cookware used for cooking in the cooking process, the cooking process information being associated with the cookware information,
wherein the playback unit is configured to play the content stored in the storage unit,
the object appearance information acquisition unit is further configured to determine, for each of the one or more objects, a last appearance scene in which the object appears last in the content, and
based on a relationship between a scene and the last appearance scene, the presentation unit is configured to present, for each of the one or more objects, information indicating the relationship at a position corresponding to the object, when the playback unit is playing the scene.

4. The content playback device according to claim 1, wherein when the playback unit is playing a scene, the presentation unit is configured to display a first message at a position corresponding to, among the one or more objects, an object for which a scene previous to the scene is the last appearance scene.

5. The content playback device according to claim 1, wherein the object appearance information acquisition unit is further configured to determine, for each of the one or more objects, a first appearance scene in which the object appears first in the content, and
when the playback unit is playing a scene, the presentation unit is configured to display a second message at a position corresponding to, among the one or more objects, an object for which a scene following the scene is the first appearance scene.

6. The content playback device according to claim 1, wherein the presentation unit is configured to present the object appearance information of all the one or more objects which appear in the content, at a point in time when playback of the content is started.

7. The content playback device according to claim 1, wherein the presentation unit is configured to present the object appearance information of each of the one or more objects, by displaying a character string showing a name of the object in a mode according to the object appearance information.

8. The content playback device according to claim 1, wherein the presentation unit is configured to present the object appearance information of each of the one or more objects, by displaying a character string showing a name of the object in at least one of a color, a shape, and a size according to the object appearance information.

9. The content playback device according to claim 1, wherein the presentation unit is configured to present the object appearance information of each of the one or more objects, by displaying an icon which is a design symbolically representing the object in a mode according to the object appearance information.

10. The content playback device according to claim 1, further comprising
an input unit configured to accept operation by a user watching the content,
wherein the presentation unit is configured to present information relevant to, among the one or more objects, an object designated by the operation accepted by the input unit.

11. The content playback device according to claim 10, wherein the information relevant to the designated object is an image of the object.

12. The content playback device according to claim 1, wherein the presentation unit is configured to present the object appearance information by displaying a character string showing the object appearance information in a balloon.

13. The content playback device according to claim 1, wherein the presentation unit is configured to present the object appearance information by outputting the object appearance information by sound.

14. The content playback device according to claim 1, wherein when the presentation unit presents the object appearance information, the playback unit is configured to pause playback of the content, and resume the playback after a predetermined time period.

15. The content playback device according to claim 1, wherein the content is video content showing a cooking procedure, and
the one or more objects are cookware used in the cooking procedure.

16. The content playback device according to claim 10, wherein the information relevant to the designated object is an ingredient cooked using cookware shown by the object.

17. The content playback device according to claim 10, wherein the information relevant to the designated object is information on a cooking process in which cookware shown by the object is used.

18. The content playback device according to claim 1, wherein for each of the plural scenes, the object appearance information acquisition unit is configured to acquire the object appearance information of each of the one or more objects which appear in the content by analyzing the metadata, the object appearance information indicating (i) whether the object appears at least in or after the scene, and (ii) whether the object appears in the scene.

19. The content playback device according to claim 18, wherein for each of the plural scenes, the object appearance information acquisition unit is further configured to acquire the object appearance information of each of the one or more objects which appear in the content by analyzing the metadata, the object appearance information indicating whether the object appears in a scene following the scene.

20. A content playback method comprising:

playing content having plural scenes;

acquiring, for each of the plural scenes, object appearance information of each of one or more objects which appear in the content by analyzing metadata which describes the one or more objects appearing in at least one of the scenes, the object appearance information indicating, for each of the objects, that the object: 1) appears in the current scene being displayed, 2) does not appear in the current scene being displayed, but appears in a next scene after the current scene, and 3) does not appear in the current scene being displayed, but appears in a scene after the next scene; and presenting the object appearance information acquired on the current scene being played and indicating, for each of the objects, that the object: 1) appears in the current scene being displayed, 2) does not appear in the current scene being displayed, but appears in a next scene after the current scene, and 3) does not appear in the current scene being displayed, but appears in a scene after the next scene, when the playback unit is playing the content, the object appearance information being superimposed on the content of the current scene being played.

21. A non-transitory computer-readable recording medium having stored therein a program for causing a computer to execute the content playback method according to claim 20.

* * * * *